(12) United States Patent
Jung et al.

(10) Patent No.: US 12,477,320 B2
(45) Date of Patent: Nov. 18, 2025

(54) ELECTRONIC DEVICE AND METHOD FOR INSTALLING PROFILE OF EMBEDDED SUBSCRIBER IDENTITY MODULE IN ELECTRONIC DEVICE

(71) Applicant: Samsung Electronics Co., Ltd., Suwon-si (KR)

(72) Inventors: Jieun Jung, Suwon-si (KR); Hyongjin Ban, Suwon-si (KR); Jaehyeon Seo, Suwon-si (KR); Jimin Park, Suwon-si (KR); Yejin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 17/727,412

(22) Filed: Apr. 22, 2022

(65) Prior Publication Data

US 2022/0345877 A1 Oct. 27, 2022

Related U.S. Application Data

(63) Continuation of application No. PCT/KR2022/005723, filed on Apr. 21, 2022.

(30) Foreign Application Priority Data

| Apr. 23, 2021 | (KR) | 10-2021-0053208 |
| Apr. 23, 2021 | (KR) | 10-2021-0053346 |
| Nov. 17, 2021 | (KR) | 10-2021-0158876 |

(51) Int. Cl.
*H04W 8/20* (2009.01)
*H04W 8/18* (2009.01)

(52) U.S. Cl.
CPC ............. *H04W 8/20* (2013.01); *H04W 8/183* (2013.01)

(58) Field of Classification Search
None
See application file for complete search history.

(56) References Cited

U.S. PATENT DOCUMENTS 10,904,741 B2 * 1/2021 Chen .................... H04B 1/3816
10,911,945 B1 2/2021 Youngs
(Continued)

FOREIGN PATENT DOCUMENTS

| JP | 2018-511964 A | 4/2018 |
| JP | 2019-532593 A | 11/2019 |

(Continued)

OTHER PUBLICATIONS

Korean Office Action dated Jan. 26, 2023, issued in Korean Patent Application No. 10-2021-0158876.
(Continued)

*Primary Examiner* — Adolf Dsouza
(74) *Attorney, Agent, or Firm* — Jefferson IP Law, LLP

(57) ABSTRACT

An electronic device includes at least one embedded universal integrated circuit card (eUICC) each storing at least one subscriber identification information, and at least one processor electrically connected with the eUICC. The at least one processor may be configured to control to transmit, to a first server, a first request message including information about an operation related to a subscription or a subscription transfer based on the eUICC and receive a first response message from the first server, in response to the transmission of the first request message. The first response message may include information indicating that a profile to be provided for the eUICC is not ready in response to the first request message.

34 Claims, 17 Drawing Sheets

(56) References Cited

U.S. PATENT DOCUMENTS

| | | |
|---|---|---|
| 2015/0303966 A1 | 10/2015 | Lee et al. |
| 2015/0312699 A1 | 10/2015 | Rodgers et al. |
| 2016/0127132 A1 | 5/2016 | Lee et al. |
| 2016/0301529 A1 | 10/2016 | Park et al. |
| 2017/0295172 A1 | 10/2017 | Ahrens et al. |
| 2017/0338954 A1 | 11/2017 | Yang et al. |
| 2018/0027410 A1 | 1/2018 | Berard et al. |
| 2018/0060199 A1 | 3/2018 | Li et al. |
| 2019/0026092 A1 | 1/2019 | Gao |
| 2019/0028884 A1* | 1/2019 | Namiranian ........... G06Q 30/04 |
| 2019/0058989 A1 | 2/2019 | Park et al. |
| 2019/0208405 A1 | 7/2019 | Park et al. |
| 2019/0268765 A1 | 8/2019 | Park et al. |
| 2019/0327605 A1 | 10/2019 | Fan et al. |
| 2019/0364416 A1 | 11/2019 | Dumoulin et al. |
| 2020/0059778 A1 | 2/2020 | Li et al. |
| 2020/0120484 A1* | 4/2020 | Ullah ...................... H04W 4/60 |
| 2020/0137558 A1 | 4/2020 | Chaugule et al. |
| 2020/0351656 A1 | 11/2020 | Johansson et al. |
| 2022/0166776 A1 | 5/2022 | Lee et al. |
| 2024/0056794 A1* | 2/2024 | Salmela ................ H04W 8/205 |

FOREIGN PATENT DOCUMENTS

| | | | | |
|---|---|---|---|---|
| JP | WO21-220611 S | 11/2021 | | |
| KR | 10-2014-0140820 A | 12/2014 | | |
| KR | 10-2016-0067776 A | 6/2016 | | |
| KR | 10-2016-0122061 A | 10/2016 | | |
| KR | 20160122061 A | * 10/2016 | ........... H04L 63/126 |
| KR | 10-2017-0035242 A | 3/2017 | | |
| KR | 10-2017-0097549 A | 8/2017 | | |
| KR | 10-2014108 B1 | 8/2019 | | |
| KR | 10-2020-0114957 A | 10/2020 | | |
| KR | 20200114957 A | * 10/2020 | ......... H04L 63/0281 |
| KR | 10-2021-0004809 A | 1/2021 | | |
| KR | 10-2022-0018875 A | 2/2022 | | |
| KR | 10-2022-0068886 A | 5/2022 | | |

OTHER PUBLICATIONS

International Search Report dated Jul. 19, 2022, issued in International Application No. PCT/KR2022/005723.
GSM Association, IMS Profile for Voice, Video and SMS over untrusted Wi-Fi access, Version 5.0, May 23, 2017.
GSM Association, IMS Profile for Voice and SMS, Version 16.0, May 28, 2021.
GSM Association, IMS Profile for Converged IP Communications, Version 5.0, May 29, 2018.
GSM Association, Service Provider Device Configuration, Version 8.0, Oct. 16, 2020.
S.Bradner, Key words for use in RFCs to Indicate Requirement Levels, Mar. 1, 1997.
GSM Association, Recommendations for Minimum Wi-Fi Capabilities of Terminals, Version 6.0, Dec. 4, 2018.
GSM Association, Technical Adaptation of Devices through Late Customisation, Version 9.1, Feb. 8, 2021.
Telecommunication Standardization Bureau of ITU, Mobile network codes (MNC) for the international Identification plan for public networks and subscriptions (According to Recommendation ITU-T E.212), May 1, 2008.
GSM Association, Remote SIM Provisioning Technical Specification, Version 2.2.2, Jun. 5, 2020.
GSM Association, Rich Communication Suite—Advanced Communications Services and Client Specification, Version 12.0, Oct. 16, 2020.
D. Hardt, ED., The OAuth 2.0 Authorization Framework, Oct. 1, 2012.
B. Campbell et al., Assertion Framework for OAuth 2.0 Client Authentication and Authorization Grants, May 1, 2015.
M. Jones et al., JSON Web Token (JWT) Profile for OAuth 2.0 Client Authentication and Authorization Grants, May 1, 2015.
GM Association; Service Entitlement Configuration Version 6.0; Feb. 8, 2021; Office Document TS.43—Service Entitlement Configuration; XP40719248; Feb. 17, 2021; London, UK.
Extended European Search Report dated Jun. 18, 2024; European Appln. No. 22792046.9-1215 / 4277314 PCT/KR2022005723.
Saudi Arabian Office Action with English translation dated Jan. 25, 2025; Saudi Arabian Appln. No. 523450872.
GSMA; Service Entitlement Configuration; Version 6.1; GSM Association Non-confidential Official Document TS.43—Service Entitlement Configuration; Apr. 7, 2021.
GSMA; Service Entitlement Configuration; Version 9.0; GSM Association Non-confidential Official Document TS.43—Service Entitlement Configuration; Jan. 8, 2023.

\* cited by examiner

ELECTRONIC DEVICE AND METHOD FOR INSTALLING PROFILE OF EMBEDDED SUBSCRIBER IDENTITY MODULE IN ELECTRONIC DEVICE

CROSS-REFERENCE TO RELATED APPLICATION(S)

This application is a continuation application, claiming priority under § 365(c), of an International application No. PCT/KR2022/005723, filed on Apr. 21, 2022, which is based on and claims the benefit of a Korean patent application number 10-2021-0053208, filed on Apr. 23, 2021, in the Korean Intellectual Property Office, of a Korean patent application number 10-2021-0053346, filed on Apr. 23, 2021, in the Korean Intellectual Property Office, and of a Korean patent application number 10-2021-0158876, filed on Nov. 17, 2021, in the Korean Intellectual Property Office, the disclosure of each of which is incorporated by reference herein in its entirety.

TECHNICAL FIELD

The disclosure relates to an electronic device and a method for installing a profile of an embedded subscriber identity module (eSIM) in an electronic device.

BACKGROUND ART

In a wireless communication system, an electronic device (e.g., user equipment (UE)) may access a wireless communication network and use a voice communication or data communication service in a fixed position or on the move. To provide a communication service to an electronic device, an appropriate authentication process is required. In general, a universal integrated circuit card (UICC) is inserted into the electronic device, and authentication is performed between the electronic device and the server of the mobile network operator (MNO) through a universal subscriber identity module (USIM) installed in the UICC. UICC may be called subscriber identity module (SIM) in the case of global system for mobile communications (GSM) and USIM in the case of wideband code division multiple access (WCDMA), long term evolution (LTE), and new radio (NR).

If the user of the electronic device subscribes to a wireless communication service provided by the mobile network operator, the mobile network operator may provide a UICC (e.g., a SIM card or a USIM card) to the user. The user may insert the provided UICC into her electronic device. If the UICC is inserted into the electronic device, the USIM application installed in the UICC is executed, and an appropriate authentication process may be performed with the server the mobile network operator, which stores the same value, using to the international mobile subscriber identity (IMSI) value stored in the UICC and the encryption key value for authentication. After the appropriate authentication process is performed, the wireless communication service may be used.

The UICC may be manufactured as a dedicated card for a specific communication carrier at the request of the specific communication carrier when manufacturing the card and may come equipped with authentication information (e.g., USIM application and subscriber identification ID (e.g., IMSI)) for network connection of the corresponding communication carrier and an encryption key (e.g., a known K value or Ki value). The UICC may be provided to subscribers of the communication service through the corresponding communication carrier and, as necessary later, the communication carrier may use technology, such as over the air (OTA), to install, modify, and delete applications within the UICC. The user may insert the UICC into the terminal and use the network and application services of the corresponding communication carrier. When replacing the terminal, the user may insert a removable UICC from the old terminal to the new terminal, thereby using the authentication information, phone number, and personal contact information stored in the UICC on the new terminal.

Unlike UICCs, which are manufactured and distributed exclusively for a specific communication carrier, the user may purchase a specific UICC or the user may subscribe to (or purchase) a communication service after obtaining a UICC and the user may subscribe to and cancel, open a service from a specific wireless communication carrier or transfer to another communication carrier (e.g., a subscription transfer). Thus, there have been proposed methods for remotely installing the communication carrier's USIM application and subscriber identity ID and encryption key on the UICC, and safely and flexibly installing and managing authentication information for various communication carriers.

For example, there has been proposed so-called embedded UICC (eUICC) capable of remotely installing a profile for providing a communication service through a network without replacing the UICC even when the user changes a communication carrier. The eUICC may be manufactured as a pre-mounted UICC, fixed in the form of a chip, in the terminal during the manufacturing process of the terminal. Accordingly, the eUICC may be used for various terminals that may have a structure in which it is not easy to mount or remove the UICC, such as machine to machine (M2M) or device to device (D2D) terminals, as well as general wireless terminal, such as mobile phones. The eUICC may also be referred to as an eSIM.

DISCLOSURE

Technical Problem

An eSIM-equipped electronic device may download a profile in various manners to use the eSIM. For example, the electronic device may download a profile through a profile providing server (e.g., subscription manager data preparation plus (SM-DP+)) after subscribing to a communication service online.

When downloading a profile online, the communication carrier server of the communication carrier (e.g., a profile information transfer server (e.g., entitlement server)) requests the profile providing server (e.g., SM-DP+) to prepare for a profile at the time when the subscription to the communication service is complete. Thus, a delay may occur in downloading the profile. In this case, the communication carrier may notify the electronic device that the profile is ready through a push message at the time when the profile providing server completes preparation of the profile.

If the electronic device fails to normally receive the push message indicating that the profile is ready, the electronic device may keep waiting for a push message despite being able to download the profile, causing a failure in normal downloading. Since the communication carrier may be unaware of whether the electronic device normally receives the push message, it does not retransmit a push message, and the electronic device may end up indefinitely waiting for a push message.

According to various embodiments of the disclosure, there may be an electronic device capable of downloading a profile by allowing a profile check request to be made through various user interfaces (UIs) (e.g., a status bar) even when the electronic device fails to normally receive a push message indicating that a profile is ready and a method for installing a profile of an embedded SIM in the electronic device.

According to various embodiments of the disclosure, when the electronic device sends a request for subscription or subscription transfer to a communication carrier server, if the communication carrier server provides web server-related information to the electronic device (e.g., if providing a web service or web page through the web server), the communication carrier server may transmit a callback message (e.g., JS Callback message) to the electronic device. The electronic device may identify the preparation status (e.g., a delay status or ready status of the profile) based on the callback message.

As another example, when the electronic device sends a request for subscription or subscription transfer to the communication carrier server, if the communication carrier server does not provide the web server-related information to the electronic device (e.g., unless providing a web service or web page through the web server), the electronic device may fail to receive a callback message including the profile ready status from the communication carrier server. For example, as the electronic device does not receive the callback message from the communication carrier server, the electronic device may fail to identify whether the profile download preparation status is delayed.

According to various embodiments, there may be provided an electronic device and a method for installing a profile of an embedded SIM in the electronic device, in which when the electronic device sends a request for subscription or subscription transfer, a communication carrier server includes information indicating whether a profile is ready in a message responsive to the request and transmits the response message, so that the electronic device may identify whether the profile download preparation status is delayed.

Technical Solution

According to various embodiments, an electronic device may comprise at least one embedded universal integrated circuit card (eUICC) each storing at least one subscriber identification information; and at least one processor electrically connected with the eUICC. The at least one processor may be configured to control to transmit, to a first server, a first request message including information about an operation related to a subscription or a subscription transfer based on the eUICC and receive a first response message from the first server, in response to the transmission of the first request message. The first response message may include information indicating that a profile to be provided for the eUICC is not ready in response to the first request message.

According to various embodiments, an electronic device may comprise at least one embedded universal integrated circuit card (eUICC) each storing at least one subscriber identification information and at least one processor electrically connected with the eUICC. The at least one processor may be configured to receive a request for identifying a profile, based on that address information corresponding to a profile providing server providing the profile is not identified, obtain the address information corresponding to the profile providing server from a communication carrier server, transmit a message for identifying a status of preparation of the profile to the profile providing server, based on the address information corresponding to the profile providing server, and based on identifying that the profile is ready, controls to download the profile from the profile providing server and store the profile in the eUICC.

According to various embodiments, a method for installing a profile of an embedded SIM in an electronic device including at least one embedded universal integrated circuit card (eUICC) storing at least one subscriber identity information and at least one processor electrically connected with the eUICC may comprise receiving a request for identifying a profile, based on that address information corresponding to a profile providing server providing the profile is not identified, obtaining the address information corresponding to the profile providing server from a communication carrier server, transmitting a message for identifying a status of preparation of the profile to the profile providing server, based on the address information corresponding to the profile providing server, and based on identifying that the profile is ready, downloading the profile from the profile providing server and storing the profile in the eUICC.

Advantageous Effects

According to various embodiments of the disclosure, it is possible to effectively download a profile by allowing the user to directly attempt to request to identify the profile through the status bar even when the electronic device fails to normally receive a push message indicating that the profile is ready.

According to various embodiments of the disclosure, when the electronic device sends a request for a subscription or a subscription transfer to the communication carrier server, even when the communication carrier server does not provide information related to a web server to the electronic device, it is possible to download a profile without delay by including information indicating whether a profile is ready in a response message and transmitting the response message.

Other aspects, advantages, and salient features of the disclosure will become apparent to those skilled in the art from the following detailed description, which, taken in conjunction with the annexed drawings, discloses various embodiments of the disclosure.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
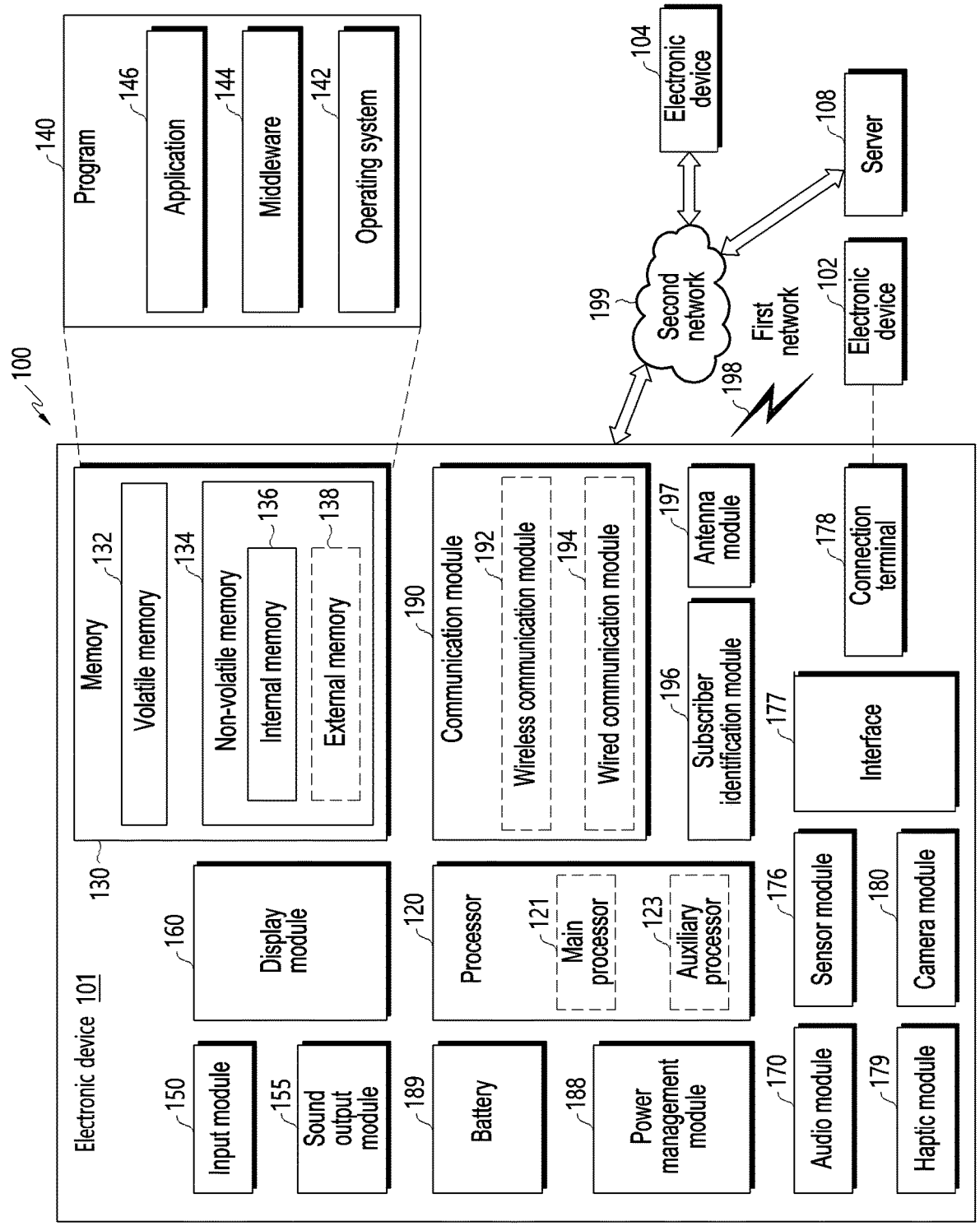
FIG. 1A is a block diagram illustrating an electronic device in a network environment according to an embodiment of the disclosure.

FIG. 1A is a block diagram illustrating an electronic device 101 in a network environment 100 according to various embodiments.

Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 1B:
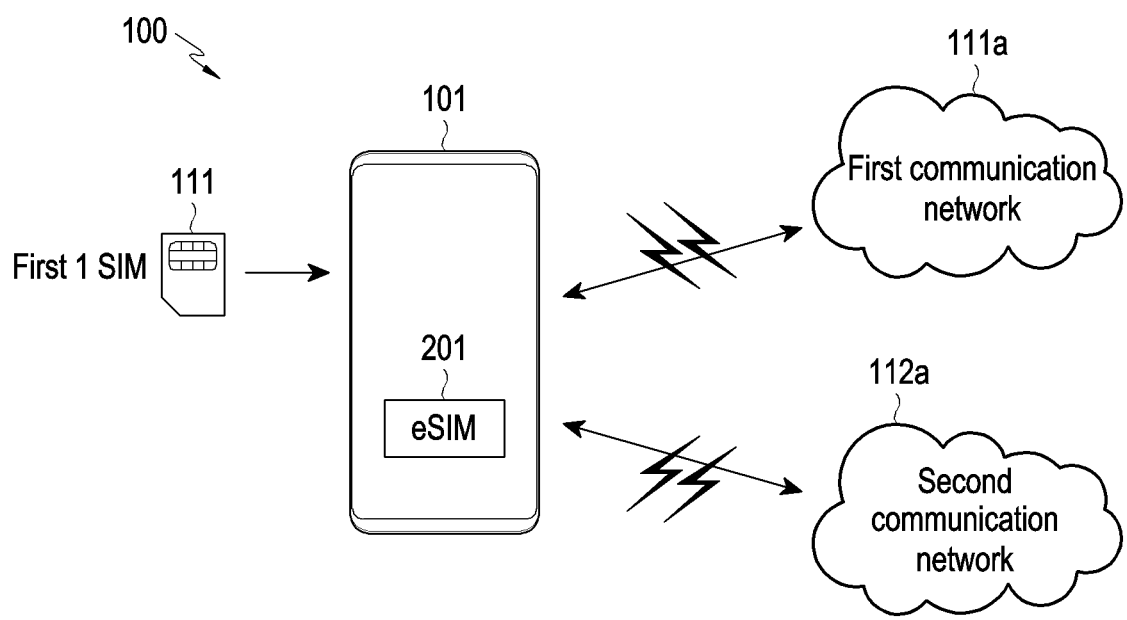
FIG. 1B is a view illustrating a network environment including an electronic device according to an embodiment of the disclosure.

FIG. 1B is a view illustrating a network environment including an electronic device according to an embodiment of the disclosure.

Referring to FIG. 1B, according to various embodiments of the disclosure, a network may include an electronic device 101, a first communication network 111a, and/or a second communication network 112a.

According to various embodiments of the disclosure, the electronic device 101 may operate as a dual SIM dual standby (DSDS) mode or dual SIM dual active (DSDA) mode electronic device supporting two SIMs in one device. For example, the electronic device 101 may include a first SIM 111 and an eSIM 201. The first SIM 111 may be an rSIM. For example, the electronic device 101 may be equipped with a SIM card. Hereinafter, for convenience of description, the SIM card will be referred to as a SIM. The electronic device 101 may include a slot (not shown) to receive the first SIM 111. According to an embodiment of the disclosure, although not shown, the electronic device 101 may receive two or more SIMs. In this case, the electronic device 101 may include a plurality of slots for receiving a plurality of SIMs.

According to various embodiments of the disclosure, the first SIM 111 is a SIM which has subscription to the mobile network operator of the first communication network 111a. The electronic device 101 may access the first communication network 111a using the first SIM 111 to receive the wireless communication service. According to various embodiments of the disclosure, the electronic device 101 may include an embedded subscriber identity module (eSIM) 201. The eSIM may be referred to as an eUICC. The electronic device 101 may receive a wireless communication service by accessing the second communication network 112a through the eSIM 201. The first communication network 111a and the second communication network 112a may be provided by the same communication carrier or may be provided by different communication carriers, separately.

Figure 2:
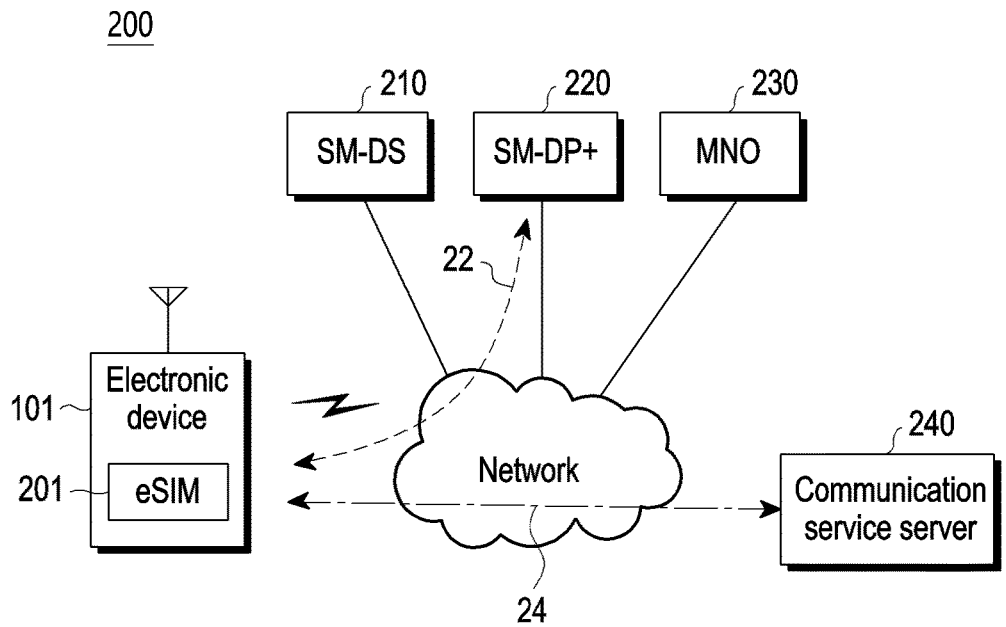
FIG. 2 is a view illustrating a system for providing a profile-based communication connection to an electronic device according to an embodiment of the disclosure.

FIG. 2 is a view illustrating a system for providing a profile-based communication connection to an electronic device according to an embodiment of the disclosure.

Referring to FIG. 2, according to various embodiments of the disclosure, a system 200 may include an electronic device 101, a subscription manager discovery service (SM-DS) server 210, an SM-DP+ server 220, an MNO server 230, and a communication service server 240.

According to various embodiments of the disclosure, the electronic device 101 (e.g., the electronic device 101 of FIG. 1B) may include an eSIM 201. For convenience of description, although not illustrated, the electronic device 101 may include at least one slot for receiving at least one rSIM. According to various embodiments of the disclosure, the electronic device 101 may include or receive N (N is a natural number) SIMs (eSIMs or rSIMs) and may perform switching to use some of them. There is no limitation to combining N SIMs, and there is also no limitation to the number.

According to various embodiments of the disclosure, the eSIM 201 may be inserted into the electronic device 101, provided integrally with the electronic device 101, or implemented to be accessible by the electronic device 101. According to various embodiments of the disclosure, the eSIM 201 may allow the electronic device 101 to perform authentication with a server of a communication carrier (mobile network operator (MNO)) using information in the eSIM 201 (e.g., a profile including universal subscriber identity module (USIM) information). According to an embodiment of the disclosure, the eSIM 201 may be called a subscriber identity module (SIM) card for global system for mobile communications (GSM) or called a USIM card for wideband code division multiple access (WCDMA), LTE, and NR, and may also be called in other various terms depending on communication schemes. For example, if the user of the electronic device 101 subscribes to a wireless communication service provided by a communication carrier, the electronic device 101 may use information in the eSIM 201, e.g., IMSI value and encryption key K for authentication, to perform an appropriate authentication process with the server of the communication carrier, which stores the same value, and then use the wireless communication service. For example, the appropriate authentication process may be authentication and key agreement (AKA) authentication. Other authentication schemes may also be used.

According to various embodiments of the disclosure, the eSIM 201 may be manufactured as a dedicated card for a specific communication carrier at the request of the specific communication carrier when manufacturing the card and may come equipped with authentication information (e.g., USIM application and subscriber identification ID (e.g., IMSI)) for network connection of the corresponding communication carrier and an encryption key (e.g., a known K value or Ki value). An application (or information) in the eSIM 201 may be installed, modified, deleted, or updated using a technology, such as over the air (OTA) when necessary.

According to various embodiments of the disclosure, the eSIM 201 may download and/or store information for providing a communication service, in the form of a profile. According to an embodiment of the disclosure, the profile may be installed or stored in the manufacturing process of the eSIM 201 or may be downloaded by the terminal in an OTA scheme and installed or stored in the eSIM 201. For example, the profile may include a provisioning profile and an operational profile. It will be appreciated by one of ordinary skill in the art that even when the provisioning profile is not installed, the electronic device 101 may download the operational profile through a Wi-Fi short-range connection or an Internet connection, and the provisioning profile does not necessarily need to be installed on the electronic device 101. For example, the operational profile may be a profile including subscriber identification information about the user of the electronic device, and the provisioning profile may include information (hereinafter, "first information") for downloading subscriber identity information or a profile (hereinafter, a "first operational profile") including subscriber identity information (hereinafter, "first subscriber identity information") in the electronic device. The electronic device may download the first operational profile based on the first information on the provisioning profile in the eSIM 201.

According to various embodiments of the disclosure, the electronic device 101 may receive a communication service using subscriber identity information (hereinafter, 'second subscriber identity information') of an operational profile (hereinafter, a 'second operational profile') installed or stored in the eSIM 201. For example, the profile including subscriber identification information may be a SIM profile.

According to an embodiment of the disclosure, the operational profile may include, in addition to the subscriber identification information, the subscriber's network access authentication information, the subscriber's phone book, the subscriber's personal information (e.g., a short message service (SMS)), the subscribed communication carrier name, available services, available data amount, fee or service provision speed, or information to allow for safe use of wireless communication by performing subscriber authentication and traffic security key generation upon accessing a wireless communication network, such as GSM, WCDMA, LTE, or NR.

According to various embodiments of the disclosure, the first information for downloading data (e.g., the first operational profile) including the first subscriber identity information may include communication session information for a designated first communication connection for downloading the first operational profile. For example, the communication session information may include subscription manager discovery service (SM-DS) server 210 access information for downloading the first operational profile or information about the communication carrier network available for SM-DS server 210 access.

According to various embodiments of the disclosure, the SM-DS server 210 may provide the electronic device 101 with the address of the SM-DP+ server 220 for downloading the first operational profile based on the provisioning profile.

According to various embodiments of the disclosure, the subscription manager data preparation plus (SM-DP+) server 220 may be a profile providing server, an off-card entity of profile domain, a profile encryption server, a profile generating server, a profile provisioner, or a profile provider. The SM-DP+ server 220 may perform a first communication connection 22 with the electronic device 101 through a wireless communication network based on a first communication connection request based on the provisioning profile from the electronic device 101 and may provide the first operational profile to the electronic device 101 through the first communication connection 22. According to various embodiments of the disclosure, the wireless communication network may be a specific node of the wireless communication network. For example, the wireless communication network may be a base station, a subscriber information management node, or a mobility management node of the wireless communication network. According to an embodiment of the disclosure, the wireless communication network may include a home position register (HLR) and/or authentication center (AuC) server that is accessed by the electronic device 101 to perform a subscriber authentication function and, by access after authentication, may connect to the communication service server 240 capable of providing communication services, such as voice communication or data communication.

According to various embodiments of the disclosure, the mobile network operator (MNO) server 230 may be a server associated with a mobile communication network operator. According to various embodiments of the disclosure, the MNO server 230 may request the subscription manager discovery service plus (SM-DS+) server 220 to prepare for at least one profile (or profile package) (e.g., the first operational profile) associated with at least one subscriber identity information (e.g., the first subscriber identity information) and transfer information associated with the first operational profile to the SM-DS+ server 220. According to an embodiment of the disclosure, the MNO server 230 may transfer a signal for updating and managing the first operational profile to the SM-DS+ server 220. The MNO server 230 may perform second communication connection 24 between the electronic device 101 and the communication service server 240 through the second operational profile installed in the eSIM 201 of the electronic device 101.

According to various embodiments of the disclosure, the communication service server 240 may be a server providing communication services. According to various embodiments of the disclosure, the communication service may be a service associated with transmission or reception of data through a wireless communication network. According to an embodiment of the disclosure, the communication service may include a service associated with transmission or reception of another profile (or data) not including subscriber identity information other than downloading the operational profile (e.g., the first operational profile including the first subscriber identity information). For example, the communication service server 240 may include a service server associated with various data transmission and reception, such as a server associated with each of various applications, a push server, a search server, or a market server. The communication service by the communication service server 240 may include various services, such as data transmission/reception by application, notification reception, push message reception, link reception and access, or service request.

According to various embodiments of the disclosure, upon requesting a service associated with transmission or reception of a profile (or data) not including subscriber identity information, the electronic device 101 may perform the second communication connection 24 with the communication service server 240 based on the second operational profile.

According to various embodiments of the disclosure, the SM-DS server 210, the SM-DP+ server 220, the MNO server 230, or the communication service server 240 is merely an example of implementation of servers for performing each function, may be called by other names, and the SM-DS server 210, SM-DP+ server 220, MNO server 230, or communication service server 240 each may be including one or a plurality of servers. Some or all of the SM-DS server 210, the SM-DP+ server 220, the MNO server 230, or the communication service server 240 may be configured as one integrated server. According to various embodiments of the disclosure, an electronic device (e.g., the electronic device 101 of FIG. 1A or 1B or the electronic device 101 of FIG. 2) may comprise a display (e.g., the display module 160 of FIG. 1A), a communication module (e.g., the communication module 190 of FIG. 1A), an embedded subscriber identity module (e.g., the subscriber identity module 196 of FIG. 1A or the eSIM 201 of FIG. 2) storing first information associated with a first communication connection for downloading data including first subscriber identity information for accessing at least one communication service providing server, a memory (e.g., the memory 130 of FIG. 1A or the memory 211 of FIG. 2), and a processor (e.g., the processor 120 of FIG. 1A) electrically connected with the display, the communication module, and the memory. The processor may be configured to perform the first communication connection for downloading the data including the first subscriber identity information based on the first information using the communication module, terminating the first communication connection upon request for transmission or reception of data not including the first subscriber identity information during the first communication connection, and perform transmission or reception of the data by performing a second communication connection based on second subscriber identity information.

According to various embodiments of the disclosure, the first information may include a provisioning profile, and the data including the first subscriber identification information may include a first operational profile.

According to various embodiments of the disclosure, the processor may be configured to display that there is no second operational profile corresponding to the second subscriber identity information, through the display, when the subscriber identity module does not include the second subscriber identity information upon request for transmission or reception of the data during the first communication connection.

According to various embodiments of the disclosure, the processor may be further configured to display a purchase screen associated with the second operational profile when the second operational profile does not exist.

According to various embodiments of the disclosure, the processor may be configured to perform a second communication session based on a second operational profile used before.

According to various embodiments of the disclosure, the processor may be configured to perform a second communication session based on a second operational profile selected by the user.

According to various embodiments of the disclosure, the processor may be configured to display at least one indicator indicating the first communication connection based on the provisioning profile through the display.

According to various embodiments of the disclosure, the at least one indicator may include at least one type of a service provider name (SPN), a radio access technology (RAT), and a reception signal strength indicator (RSSI).

According to various embodiments of the disclosure, the processor may be configured to select the provisioning profile associated with a network being in connection through the communication module.

According to various embodiments of the disclosure, the processor may be configured to select the provisioning profile associated with the network being in connection based on at least one of a public land mobile network (PLMN) identifier, a mobile country code (MCC), and area information about a network being in connection through the communication module.

Figure 3:
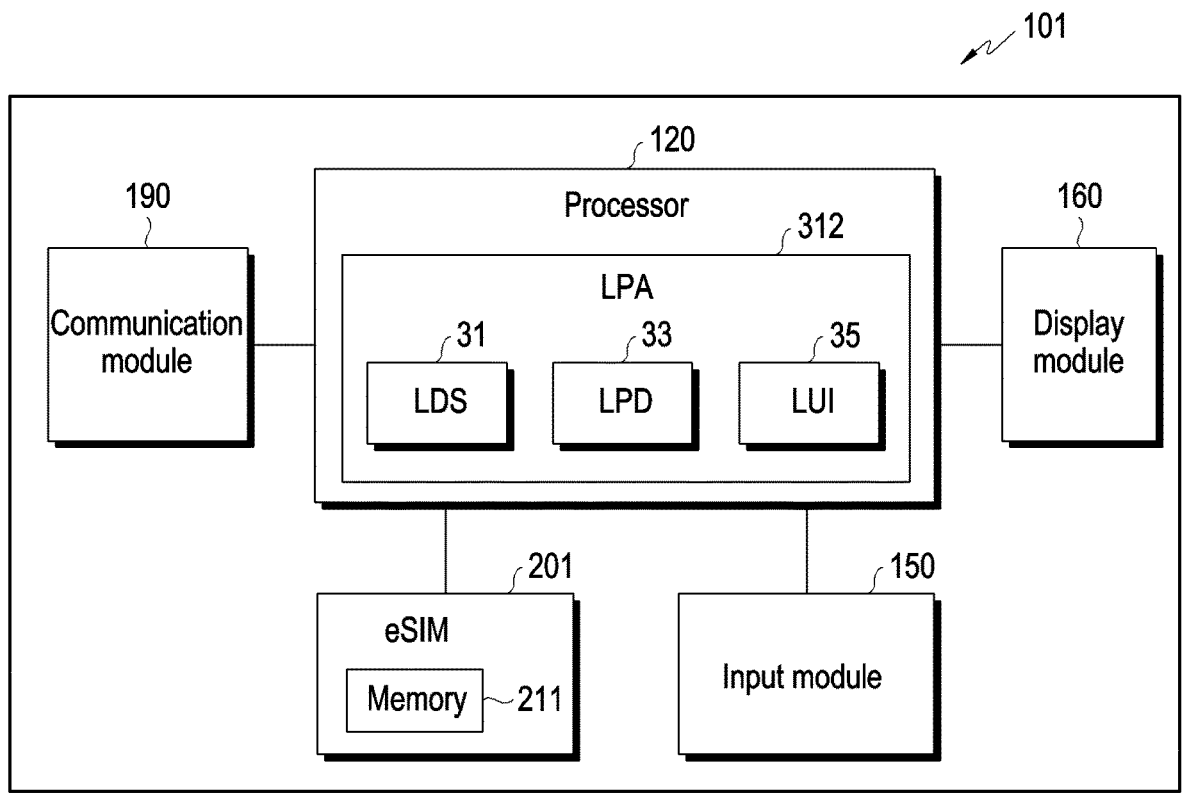
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, according to various embodiments of the disclosure, the electronic device 101 of FIG. 1A or 1B or the electronic device 101 of FIG. 2 may include a processor 120, an eSIM 201, a communication module 190, and a display module 160, and an input module 150. For convenience of description, although not illustrated, the electronic device 101 may include two or more slots capable of receiving two or more rSIMs.

According to various embodiments of the disclosure, the processor 120 (e.g., the processor 120 of FIG. 1A) may include one or more processors (e.g., the main processor 121 and the auxiliary processor 123 or the application processor and the communication processor of FIG. 1A) and, according to an embodiment of the disclosure, may include a local profile assistant (LPA) 312 (e.g., an LPAd (device)). According to various embodiments of the disclosure, when the processor 120 includes a plurality of processors, a portion of the LPA 312 may be included in some of the plurality of processors, and another portion of the LPA 312 may be included in others thereof. According to various embodiments of the disclosure, the LPA 312 may be included in the eSIM 201 and, in this case, the LPA 312 may be referred to as an LPAe (eUICC).

According to various embodiments of the disclosure, the LPA 312 may perform communication with a server to support profile download, installation, and management operations of the eSIM 201 or may perform the operation of providing a user interface required in the profile download, installation, and management operations. The LPA 312 may be a module that provides local discovery services (LDSs) 31, local profile download (LPD) 33, and local user interface (LUI) 35 operations in the electronic device 101.

According to various embodiments of the disclosure, the LDS 31 may perform the operation of receiving the address of the SM-DS+ server 220 capable of downloading the operational profile based on the provisioning profile from the SM-DS server 210 and communication with the SM-DS server 210.

According to various embodiments of the disclosure, the LPD 33 may perform the first communication connection 22 with the SM-DS+ server 220 through the wireless communication network based on the address of the SM-DS+ server 220 and perform the operation of receiving the first operational profile from the SM-DS+ server 220 through the first communication connection 22. According to various embodiments of the disclosure, the LPD 33 may support profile download, enable, disable, delete, or profile policy rule (PPR) download operations, started by the network, or may support profile enable, disable, delete, or eUICC reset operations by the electronic device.

According to various embodiments of the disclosure, the LUI 35 may perform the operation of providing various user interfaces upon downloading the operational profile. According to an embodiment of the disclosure, the LUI 35 may support data exchange between the LDS 31 and the LPD 33 and may include a UI for transferring the user's input to the LDS 31 or LPD 33.

According to an embodiment of the disclosure, the processor 120 may perform a communication service based on information stored in the eSIM 201 using (or by executing) the LPA 312. For example, the processor 120 may perform the first communication connection to download the profile (e.g., the first operational profile) including the first subscriber identity information, with the SM-DS+ server 220 through the communication module 190 based on the provisioning profile stored in the eSIM 201, using the LPA 312. Upon request of transmission or reception of the profile or data not including subscriber identity information during the first communication connection using the LPA 312, the processor 120 may terminate the first communication connection and perform the second communication connection based on the second subscriber identity information to transmit or receive a profile or data not including the subscriber identity information.

According to various embodiments of the disclosure, the eSIM 201 (e.g., the subscriber identification module 196 of FIG. 1A or the eSIM 201 of FIG. 2) may include one or more profiles, as information for receiving a communication service. The profile may mean a packaging, in the form of software, of at least one of applications, file systems, and authentication key values stored in the eSIM 201. For example, the profile may include a provisioning profile and an operational profile. The operational profile may include the subscriber identification information and may further include the subscriber's network access authentication information, the subscriber's phone book, the subscriber's personal information (e.g., SMS), the subscribed communication carrier name, available services, available data amount, fee or service provision speed, or information to allow for safe use of wireless communication by performing subscriber authentication and traffic security key generation upon accessing a wireless communication network, such as GSM, WCDMA, LTE, or NR. According to an embodiment of the disclosure, the operational profile may include a SIM profile. For example, the SIM profile may include a SIM file system (master file (MF), dedicated file (DF), elementary files (EF)). A subscriber identification information (IMSI) value may be stored in an elementary file.

According to various embodiments of the disclosure, the provisioning profile may be a profile including first information for downloading the first operational profile in the electronic device. For example, the first information may include communication session information for the first communication connection designated for downloading the first operational profile. For example, the communication session information may include SM-DS server (e.g., the SM-DS server 210 of FIG. 2) access information for downloading the first operational profile and may include information about the communication carrier network available for SM-DS server access.

According to various embodiments of the disclosure, the communication module 190 (e.g., the communication module 190 of FIG. 1A) may perform first communication based on the provisioning profile or second communication based on the second operational profile. At least one screen associated with the first communication based on the provisioning profile or the second communication based on the second operational profile may be displayed on the display module 160.

According to an embodiment of the disclosure, the LPA 312 has been described as being included in the processor 120, but at least some functions of the LPA 312 may be performed by the processor 120, or a separate LPA 312 may be operated in conjunction with the processor 120. For example, the LPA 312 may be included in a program (e.g., the program 140 of FIG. 1A) and may be loaded onto the processor 120 and executed. When the LPA 312 is loaded on the processor 120 and executed, it may be understood as the operation of the processor 120. According to various embodiments of the disclosure, the function modules (e.g., the LDS 31, the LPD 33, or the LUI 35) included in the LPA 312 are exemplarily split and may not be limited as expressed as other function modules. According to various embodiments of the disclosure, the LPA 312 may be included in the eSIM 201.

Figure 4:
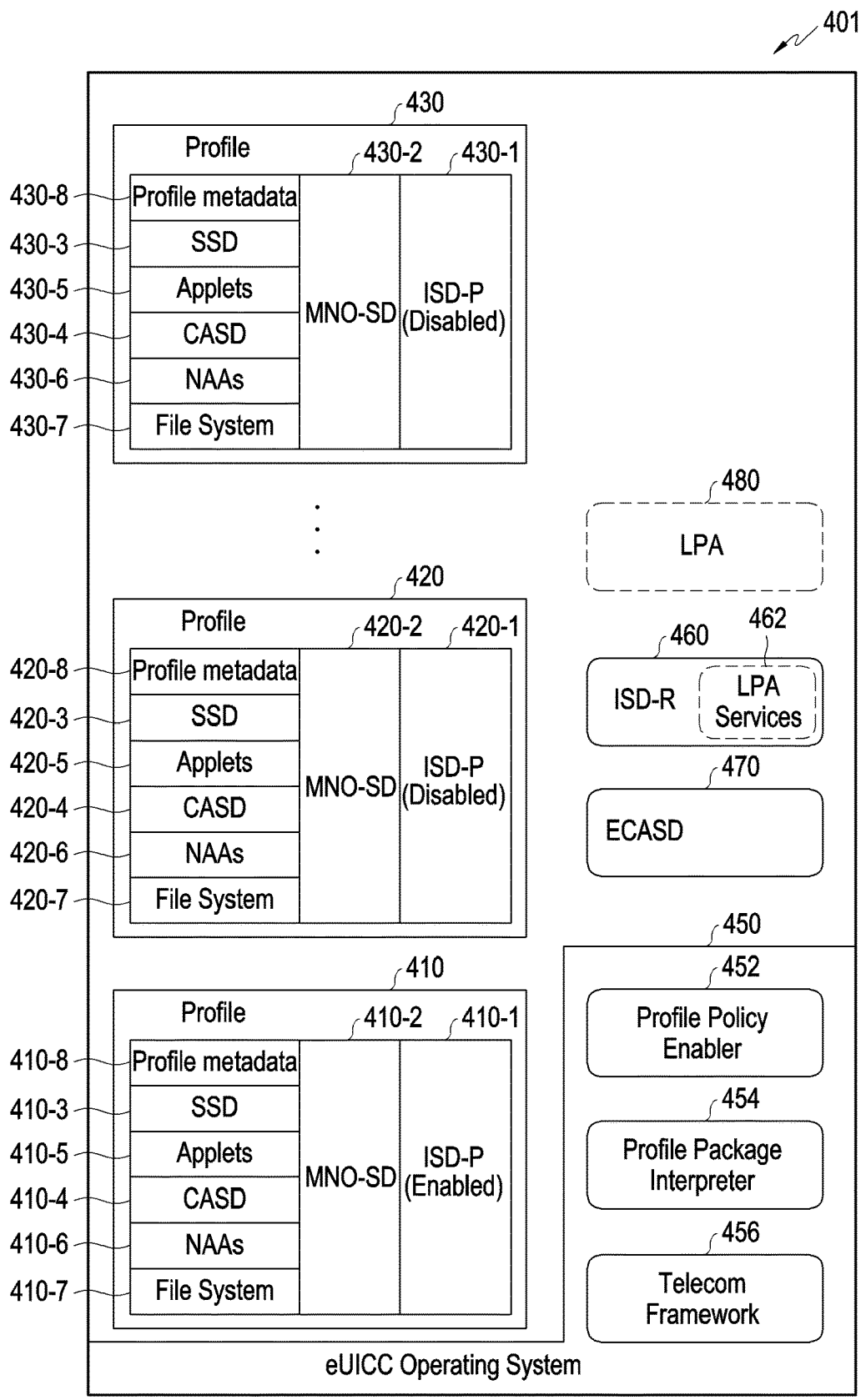
FIG. 4 is a view illustrating an internal structure of an embedded universal integrated circuit card (eUICC) according to an embodiment of the disclosure.

FIG. 4 is a view illustrating an internal structure of an eUICC according to an embodiment of the disclosure.

Referring to FIG. 4, according to an embodiment of the disclosure, an eUICC 401 (e.g., the eSIM 201 of FIG. 2 or 3) may be in the form of a card or chip, and at least one profile 410, 420, and 430 in the form of software may be installed. According to various embodiments of the disclosure, each of the one or more profiles 410, 420, and 430 may be a provisioning profile or an operational profile. At least one profile 410, 420, and 430 may operate on an eUICC operating system (OS) 450. Each of the at least one profile 410, 420, and 430 may be enabled or disabled by a processor or LPA (e.g., LPA 312 of FIG. 3 or LPA 480 of FIG. 4).

According to an embodiment of the disclosure, one profile 410 may be in an enabled status, and the remaining profiles 420 and 430 may be in a disabled status. According to various embodiments of the disclosure, two or more profiles may be in an enabled status.

According to various embodiment of the disclosure s, the eUICC operating system (OS) 450 of the eUICC 401 may include a profile policy enabler 452, a profile package interpreter 454, and a telecom framework 456. According to an embodiment of the disclosure, the profile policy enabler 452 may manage a policy rule (profile policy rule (PPR)) for each of the one or more profiles 410, 420, and 430. According to an embodiment of the disclosure, the profile package interpreter 454 may unpackage the profile package received from the SM-DP 220, in a form that may be installed in the eUICC 401. According to an embodiment of the disclosure, the telecom framework 556 may perform a function associated with communication of applications in the eUICC 401. According to various embodiments of the disclosure, the eUICC 401 may include an issuer security domain root (ISD-R) 460 and an eUICC controlling authority security domain (ECASD) 470. According to an embodiment of the disclosure, the ISD-R 460 may manage at least one profile 410, 420, and 430 installed in the eUICC 401. For example, ISD-R 460 may include LPA services 462. The LPA services 462 may manage at least one profile 410, 420, and 430 installed in the eUICC 401 through an interface with the processor or LPA (e.g., the LPA 312 of FIG. 3 or the LPA 480 of FIG. 4). According to an embodiment of the disclosure, the ECASD 470 may perform security processing on at least one profile 410, 420, and 430 installed in the eUICC 401.

According to various embodiments of the disclosure, each of the at least one profile 410, 420, and 430 may include an ISD-P 410-1, 420-1 or 430-1, an MNO-SD 410-2, 420-2 or 430-2, a supplementary security domain (SSD) 410-3, 420-3 or 430-3, a controlling authority security domain (CASD) 410-4, 420-4 or 430-4, applets 410-5, 420-5 or 430-5, network access applications (NAAs) 410-6, 420-6 or 430-6, a file system 410-7, 420-7 or 430-7, or profile metadata 410-8, 420-8 or 430-8.

According to an embodiment of the disclosure, the ISD-P 410-1, 420-1 or 430-1 may include information for decoding and interpretation of the profile package, and in cooperation with the profile package interpreter 454, may be used to unpackage and install the profile package received from the SM-DP+ 220.

According to an embodiment of the disclosure, the MNO-SD 410-2, 420-2 or 430-2 may include the OTA key of the MNO and may include information for providing a secure OTA channel capable of communicating with the MNO.

According to an embodiment of the disclosure, the supplementary security domain (SSD) 410-3, 420-3 or 430-3 and the controlling authority security domain (CASD) 410-4, 420-4 or 430-4 may include information for performing security processing on the profile.

According to an embodiment of the disclosure, the applets 410-5, 420-5, or 430-5 may include various application information associated with the user of the profile.

According to an embodiment of the disclosure, network access applications (NAAs) 410-6, 420-6 or 430-6 may include application information that allows the profile to access the network.

According to an embodiment of the disclosure, the file system 410-7, 420-7 or 430-7 may include a file system associated with each piece of information in the profile.

According to an embodiment of the disclosure, the profile metadata 410-8, 420-8 or 430-8 may also be referred to as a profile record and may include metadata information about the profile in text form. The metadata information may include at least one of the profile's integrated circuit card ID (ICCID), profile name, profile providing MNO's name, user's profile nickname, icon, profile class, notification configuration information, profile owner information, or profile policy rule (PPR).

According to various embodiments of the disclosure, the ICCID of the profile, as a profile identifier, may indicate a unique identifier of each profile. The name of the profile may include the name of each profile. The profile providing MNO's name may include the name of the communication carrier that provided the profile. The user's profile nickname may include the user-specified profile nickname. The icon may include an icon corresponding to the profile. The profile class may include information indicating whether the profile type is a provisioning profile or an operational profile. The notification configuration information may include the address of the server (e.g., the SM-DP+ server 220) to receive notifications. The profile owner information may include mobile country code (MCC), mobile network code (MNC), and group identifier (GID) 1 or 2 information associated with the profile owner. For example, the MCC may be a code for identifying the country, and the MNC may be a code for identifying the mobile communication carrier. GID 1 or 2 may be code area information for identifying the group or area to which the profile belongs. The area information may include a group including a plurality of countries. The profile policy rule (PPR) may include policy rule information for managing the profile.

According to various embodiments of the disclosure, the electronic device 101 may identify whether it is a provisioning profile or an operational profile using the profile class information of the profile metadata 410-8, 420-8 or 430-8 included in each of at least one profile 410, 420 or 430 included in the eUICC 401 and enable or disable each of the provisioning profile or the operational profile through the LPA (the LPA 312 of FIG. 3 or the LPA 480 of FIG. 4).

Figure 5:
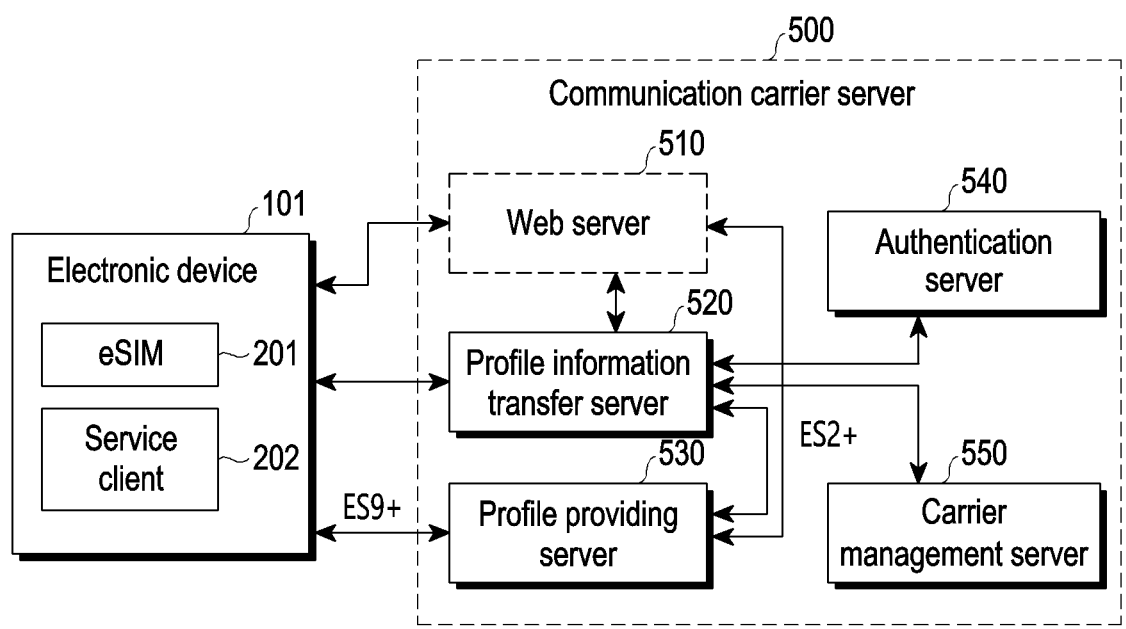
FIG. 5 is a block diagram illustrating a network system for downloading a profile according to an embodiment of the disclosure.

FIG. 5 is a block diagram illustrating a network system for downloading a profile according to an embodiment of the disclosure.

Referring to FIG. 5, according to various embodiments of the disclosure, a network system may include an electronic device 101 and a communication carrier server 500. The communication carrier server 500 may include a profile information transfer server 520, a profile providing server 530, an authentication server 540, or a carrier management server 550. According to various embodiments of the disclosure, the communication carrier server 500 may include, or may not include, a web server 510. For example, at least one of the web server 510, the profile information transfer server 520, the profile providing server 530, the authentication server 540, or the carrier management server 550 may be included in a communication carrier server 500 managed by the communication carrier. The carrier management server 550 may include, but is not limited to, business support systems (BSS) or operations support systems (OSS). According to various embodiments of the disclosure, the web server 510 and the profile information transfer server 520 may be servers managed by the same communication carrier or different communication carriers. According to various embodiments of the disclosure, the profile information transfer server 520 and the profile providing server 530 may be servers managed by the same communication carrier or different communication carriers. The eSIM 201 may be inserted or embedded in the electronic device 101. A profile may be downloaded and installed in the eSIM 201. A service client 202 may be installed in the electronic device 101 for communication with the communication carrier server 500 according to embodiments to be described below.

According to various embodiments of the disclosure, the electronic device 101 may access the profile information transfer server 520 by, e.g., the service client 202, and may access the web server 510 through the accessed profile information transfer server 520. For example, when the electronic device 101 accesses the profile information transfer server 520, the profile information transfer server 520 may authenticate the electronic device 101 or the user of the electronic device 101 through the carrier management server 550 or the authentication server 540 and perform an eligibility check. If the electronic device 101 or the user of the electronic device 101 is normally authenticated and determined to be eligible, the profile information transfer server 520 may transmit information for accessing the web server 510 to the electronic device 101. The electronic device 101 may access the web server 510 using the information for accessing the web server 510 received through the profile information transfer server 520. According to various embodiments of the disclosure, the electronic device 101 may request a subscription, an opening, or a subscription transfer through a web page provided by the web server 510 and, according to another embodiment of the disclosure, may request a subscription, an opening or a subscription transfer through the profile information transfer server 520 without the web server 510. For example, when the communication carrier server 500 does not include the web server 510 or includes the web server 510 but provides information related to the web server 510 (e.g., address information about the web server 510) (e.g., when not providing a web service or web page through the web server), the electronic device 101 may request a subscription, an opening, or a subscription transfer through the profile information transfer server 520. According to various embodiments of the disclosure, the web server 510 may provide a user interface (UI) or web page for the profile information transfer server 520. For example, the electronic device 101 may request a subscription, an opening, or a subscription transfer for a specific profile through a web page provided from the web server 510. According to various embodiments of the disclosure, the profile information transfer server 520 may provide communication line management and creation, service control, and status information. The profile information transfer server 520 may be referred to as an entitlement server or an entitlement configuration server, but is not limited thereto. For example, the profile information transfer server 520 may include an entitlement server or entitlement configuration server set forth in GSMA standard document TS. 43. In the standard document, the term 'entitlement' may refer to applicability, availability, or status of a service required before providing the service (e.g., a communication service) to the user of the electronic device 101. For example, the profile information transfer server 520 may perform a function of transferring profile-related information (e.g., profile download information or profile download-related information) provided to the electronic device 101. In the following description, profile information may include information related to the profile, and for convenience of description, it will be referred to as profile download information or profile download-related information. The profile information transfer server 520 may include, but is not limited to, a discovery and push function (DPF), a subscription manager discovery service (SM-DS), a subscription manager secure routing (SM-SR), a subscription manager secure routing plus (SM-SR+), an off-card entity of eUICC profile manager or a profile management credentials holder (PMC holder), or an eUICC manager (EM).

According to various embodiments of the disclosure, the profile providing server 530 may perform a function of managing and downloading the profile. For example, the profile providing server 530 may include, but is not limited to, a subscription manager data preparation (SM-DP), a subscription manager data preparation plus (SM-DP+), an off-card entity of profile domain, a profile encryption server, a profile generation server, a profile provider (profile provisioner (PP)), a profile provider, or a profile provisioning credentials holder (PPC holder).

Figure 6:
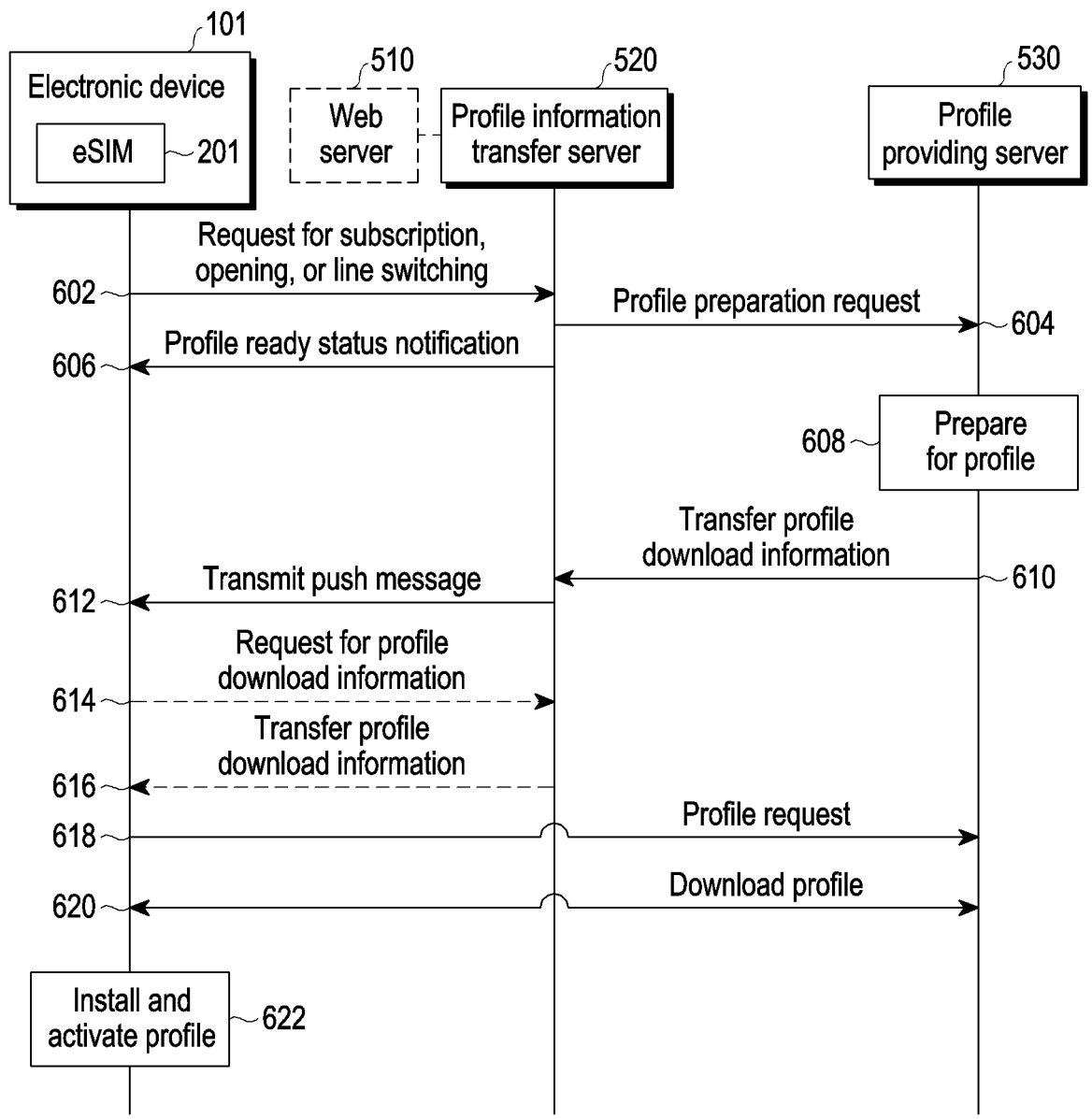
FIG. 6 is a flowchart illustrating a method for downloading a profile according to an embodiment of the disclosure.

FIG. 6 is a flowchart illustrating a method for downloading a profile according to an embodiment of the disclosure.

Referring to FIG. 6, according to various embodiments of the disclosure, the electronic device 101 may access the web server 510 through the profile information transfer server 520 of the communication carrier server 500. In operation 602, the electronic device 101 may request a new eSIM profile or request a subscription, an opening, or a subscription transfer to a new communication service through a web page provided by the web server 510. For example, the electronic device 101 may transmit a message including a subscription-related operation (e.g., a subscription, an opening, or a subscription transfer) through the web page provided by the web server 510 and, according to various embodiments of the disclosure, the transmission of the message including the subscription-related operation may follow the procedure set forth in the GSMA standard document TS but is not limited thereto. For example, the electronic device 101 may request the profile information transfer server 520 (e.g., an entitlement server) to perform an eligibility check according to the procedure set forth in the standard document TS. 43. In response to the request, the profile information transfer server 520 may transmit a profile query to another server (e.g., the carrier management server 550 (e.g., a BSS or OSS)) in the communication carrier server 500 to thereby check eligibility. After completing the eligibility check, the profile information transfer server 520 may transmit the check result to the electronic device 101. The electronic device 101 may identify that the eligibility check is normally complete and may request the profile information transfer server 520 to perform a subscription-related operation (e.g., a subscription, an opening or a subscription transfer).

According to various embodiments of the disclosure, the profile information transfer server 520 of the communication carrier server 500 may authenticate the electronic device 101 or the user of the electronic device 101 through the authentication server 540.

According to various embodiments of the disclosure, in operation 604, the profile information transfer server 520 may request the profile providing server 530 to prepare for a profile in response to the request for the subscription-related operation (e.g., a subscription, an opening, or a subscription transfer) through the electronic device 101. Information transmitted from the profile information transfer server 520 to the profile providing server 530 according to the profile preparation request may include an eUICC differentiator (e.g., eUICC identifier (EID)), information about the profile information transfer server, a profile differentiator or profile request time, profile installation key, information about the electronic device 101, or eUICC information. The profile differentiator may be referred to as a profile identifier (profile ID), an integrated circuit card ID (ICCID), an ISD-P, or a factor matching profile domain (PD). The profile identifier may indicate a unique identifier of each profile. The eUICC identifier (eUICC ID) may be a unique identifier of the eSIM 201 (or eUICC) embedded in the electronic device 101 and may be referred to as the EID. For example, when the provisioning profile is pre-equipped in the eUICC, the eUICC ID may be an identifier of the corresponding provisioning profile (profile ID of the provisioning profile). For example, when the electronic device 101 and the eSIM 201 are not separated, the eUICC ID may be the ID of the electronic device 101. The eUICC ID may refer to a specific secure domain of the eUICC chip.

According to various embodiments of the disclosure, the profile information transfer server 520 may notify the electronic device 101 of the profile ready status while the profile providing server 530 prepares for a profile in operation 606. The message for notifying of the profile ready status may include a callback message (e.g., a java script (JS) callback message). For example, the callback message may be transmitted when the electronic device 101 terminates the web page provided by the web server 510, but is not limited thereto.

According to various embodiments of the disclosure, the callback message transmitted from the profile information transfer server 520 to the electronic device 101 may be implemented in the form of "onPlanSelectionCompleted (ServiceStatus=9, smdpAddress or Activation Code)". The callback message may include service status information, the address (or address information) of the profile providing server (e.g., SM-DP+ 220) 530, or an activation code. For example, the service status information (ServiceStatus) may be represented as 9 to indicate that the profile is delayed, and the service status information may be represented as 1 to indicate that profile is ready. According to various embodiments of the disclosure, the activation code may include information corresponding to the address of the profile providing server 530. The electronic device 101 may identify the address of the profile providing server 530 based on the activation code.

According to various embodiments of the disclosure, the profile providing server 530 may prepare for a profile in operation 608. For example, when the profile identifier (e.g., ICCID) value is transferred to the profile preparation request, the profile providing server 530 may prepare for a profile corresponding to the profile identifier. As another example, if the profile identifier does not exist, the profile may be differentiated using one or more of the profile request type, information about the electronic device 101, information about eUICC, and information about the eUICC identifier, and the profile differentiator may be specified. Further, when the eUICC differentiator is included in the profile preparation request, the profile providing server 530 may download and install the specified profile only in the specific eUICC later. When the eUICC differentiator is not included in the profile preparation request, the profile providing server 530 may prepare for a profile without associating the specified profile with the specific eUICC, and upon receiving an appropriate request including the eUICC differentiator from the electronic device 101 later, allow it to download the profile with the profile associated with the eUICC.

Further, when the profile preparation request includes a profile installation key, the profile providing server 530 may associate the profile installation key with the specific profile and manage it and, when the electronic device 101 requests to download the profile with the profile installation key later, download the specific profile. The profile installation key may be referred to as an event identifier (EventID), a matching identifier (MatchingID), or an activation code, or an activation code token (activation code token or AC Token). In contrast, in a case where the profile preparation request does not include the profile installation key, in the profile preparation process, the profile providing server 530 itself may generate a profile installation key and, after the profile preparation, the profile providing server 530 may transfer the profile installation key to the profile information transfer server 520.

According to various embodiments of the disclosure, in operation 610, the profile providing server 530 may transfer profile download information (or profile download-related information) to the profile information transfer server 520. The transfer of the profile download information may mean registering the profile download information with the profile information transfer server 520. The profile information transfer server 520 may receive the profile download information and register the received profile download information. When so registered, the profile download information may be stored in the profile information transfer server 520. For example, the profile download information may include at least one of the address of the profile providing server 530, profile installation key, or eUICC information. The address of the profile providing server 530 may include at least one of a server address in the form of a full qualified domain name (FQDN), an address in the form of a full uniform resource locator (URL), or an internet protocol (IP) server address. The eUICC information may be a specific EID or a value or EID in which a hash function operation result is provided to the specific EID. The hash function operation for the EID means a calculation included in the hash operation. For example, the hash function may be performed on the EID once or twice, or passcode information, along with the EID, as factors of the hash function may be added. The passcode may be a value transferred to the user.

Figure 7A:
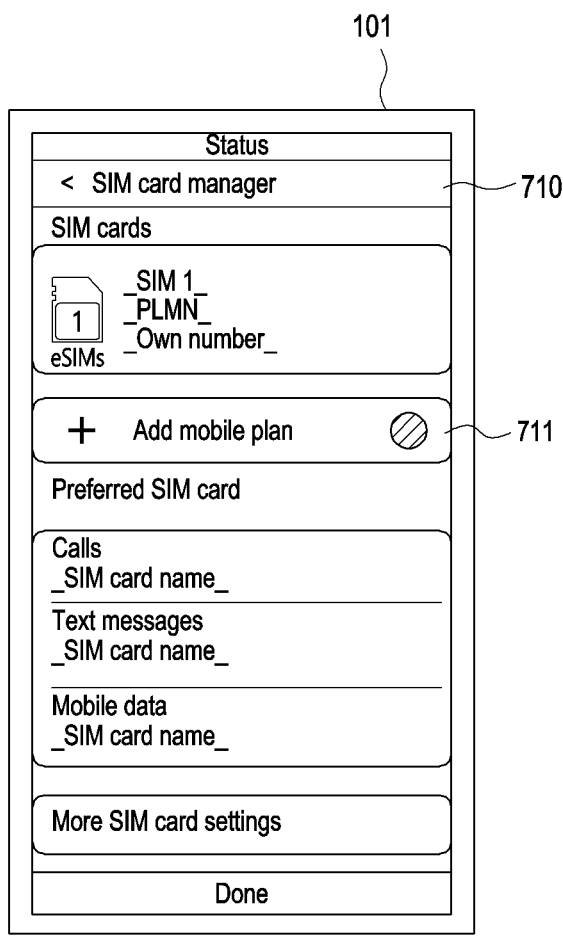
FIGS. 7A and 7B are views illustrating a user interface displayed on a screen of an electronic device according to various embodiments of the disclosure.
Figure 7B:
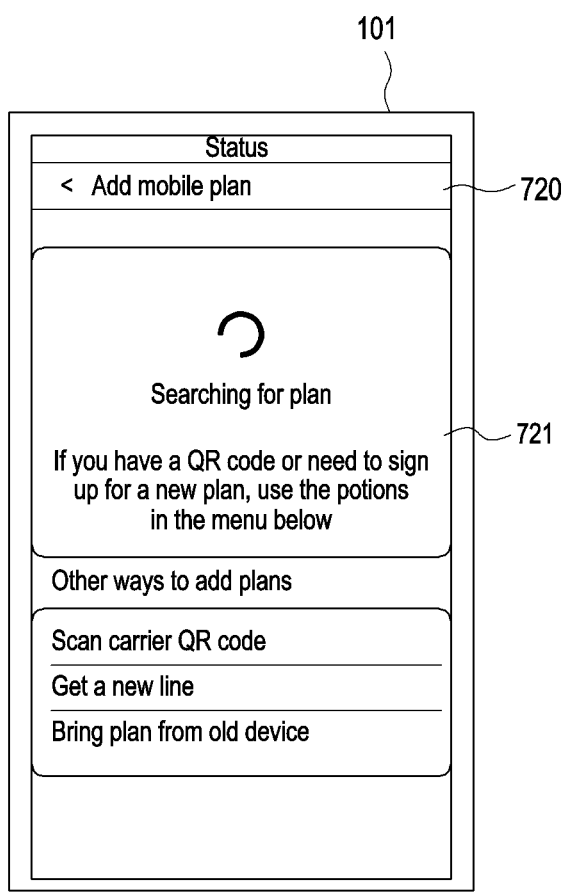

FIGS. 7A and 7B are views illustrating a user interface displayed on a screen of an electronic device according to various embodiments of the disclosure.

Referring to FIG. 7A, according to various embodiments of the disclosure, before receiving a push message indicating that profile is ready in operation 612 described below (or in a state in which the push message indicating that profile is ready is not received), the electronic device 101 may request to download the profile through a SIM card management screen 710 for downloading eSIM profile.

For example, if a menu item 711 (e.g., "Add mobile plan") is selected to add a profile on the SIM card management menu 710 shown in FIG. 7A, an add profile screen 720 may be displayed as shown in FIG. 7B.

Referring to FIG. 7B, as the menu item 711 for adding a profile is selected, the add profile screen 720 may include a screen 721 for identifying the profile ready status. For example, as the menu item 711 for adding a profile is selected, the electronic device 101 may transmit a profile check request message to the profile providing server 530. According to various embodiments of the disclosure, when the address of the profile providing server 530 is not identified by the electronic device 101 (e.g., when the address of the profile providing server 530 is not stored in the memory (e.g., the memory 130 of FIG. 1A) of the electronic device 101), the electronic device 101 may send a request for profile download information to the profile information transfer server 520. The profile information transfer server 520 may transfer the profile download information to the electronic device 101 in response to the request. The profile download information transmitted from the profile information transfer server 520 to the electronic device 101 may include the address of the profile providing server 530. According to various embodiments of the disclosure, the electronic device 101 may send a request for a profile to the profile providing server 530 based on the address of the profile providing server 530. According to various embodiments of the disclosure, if profile is ready in the profile providing server 530, even before reception of a push message, the electronic device 101 may download a profile from the profile providing server 530.

According to various embodiments of the disclosure, if the profile download information is transferred or registered to the profile information transfer server 520 in operation 610, the profile download information may be transferred to the electronic device 101 connected to the eUICC corresponding to the eUICC information. For example, the profile information transfer server 520 of the communication carrier server 500 may transfer the profile download information to the electronic device 101 through a push message in operation 612. For example, the profile information transfer server 520 may transfer the push message to the electronic device 101 through a web push server (not shown). According to various embodiments of the disclosure, the push message may be implemented in the form shown in Table 1 below.

TABLE 1

{
  "data":
  {
    "app": "PrimaryDevice",
    "notifEvent": "{Push Behaviour key value}",
    "downloadInfo":"{downloadInfo value}",
    "timestamp": "{time stamp value}"
  }
}

In Table 1, "downloadInfo" may mean the address or activation code of the profile providing server 530 (e.g., SM-DP+ 220). According to various embodiments of the disclosure, "notifEvent" in Table 1 may include information or an identifier indicating a profile ready status or a profile download ready status (e.g., "READY TO DOWNLOAD PROFILE").

According to various embodiments of the disclosure, when the communication carrier server 500 provides a profile through a plurality of profile providing servers 530, the address of the profile providing server 530 may not be included in the push message. For example, when the address of the profile providing server 530 is not stored in the memory (e.g., the memory 130 of FIG. 1A) or the push message does not include the address of the profile providing server 530, or when the callback message indicating the profile ready status notification of operation 606 does not include the address of the profile providing server 530, the electronic device 101 may send a request for profile download information (e.g., information corresponding to the address of the profile providing server 530) to the profile information transfer server 520 in operation 614. The profile information transfer server 520 may transfer the profile download information to the electronic device 101 in response to the request in operation 616. The profile download information transmitted from the profile information transfer server 520 to the electronic device 101 may include information (e.g., an FQDN-type server address, a full URL-type address, or IP server address or activation code) corresponding to the address of the profile providing server 530.

Figure 8A:
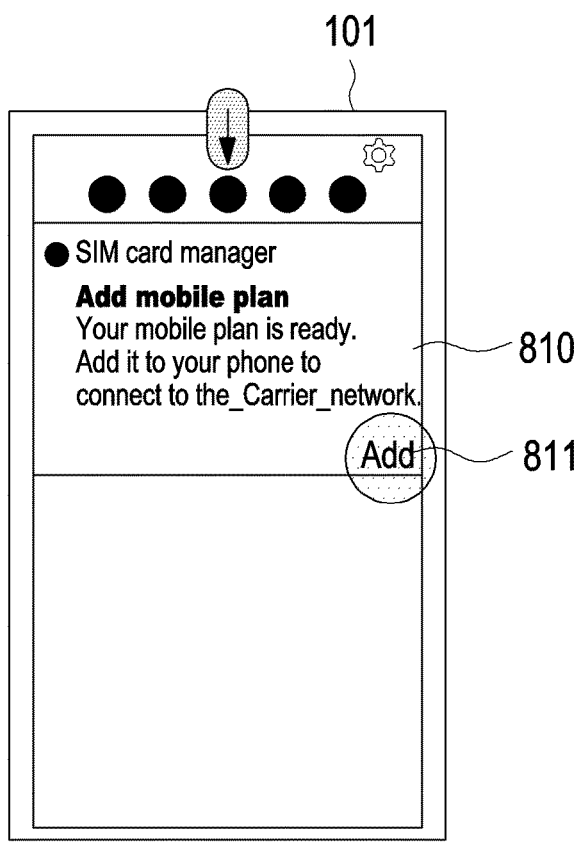
FIGS. 8A and 8B are views illustrating a user interface displayed on a screen of an electronic device according to various embodiments of the disclosure.
Figure 8B:
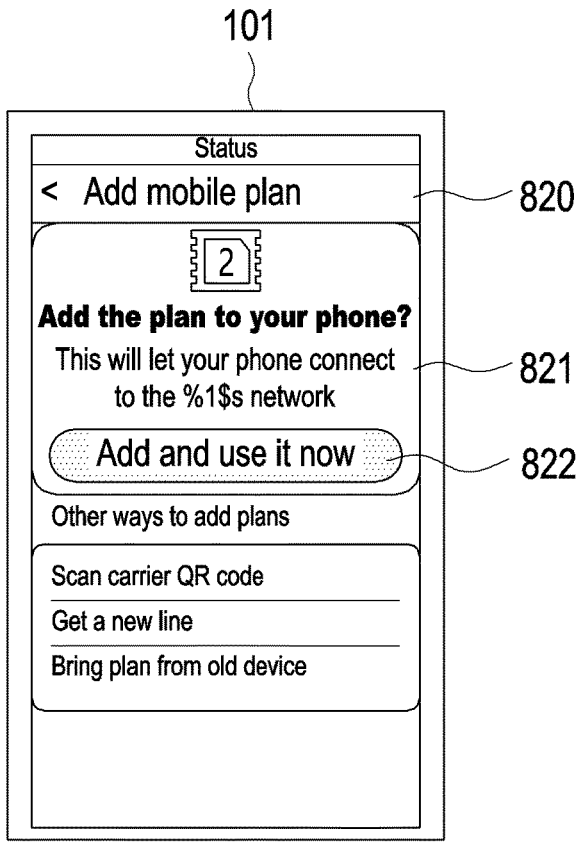

FIGS. 8A and 8B are views illustrating a user interface displayed on a screen of an electronic device according to various embodiments of the disclosure.

Referring to FIG. 8A, according to various embodiments of the disclosure, when the electronic device 101 receives the push message and identifies that profile is ready through the "notifEvent" included in the push message, the electronic device 101 may display a notification (or a notification bar) on the screen.

When the user swipes on an upper end of the screen of the electronic device 101, a notification screen 810 may be displayed as shown. For example, the notification screen 810 may indicate a function of an app related to the "SIM card manager" and may include "Add mobile plan" information related to profile download among the functions. For example, the electronic device 101 may identify that the profile is ready through the push message and may display a message indicating that the profile is ready (e.g., "Your mobile plan is ready. Add it to your phone to connect to the Carrier network"). The notification screen 810 may include a button 811 (e.g., "Add") for executing the function for downloading the profile.

According to various embodiments of the disclosure, when the user selects the button 811 for executing the function for downloading the profile, in operation 618, the electronic device 101 may send a request for a profile to the profile providing server 530 using the address of the profile providing server 530 and the profile installation key included in the profile download information.

Referring to FIG. 8B, according to the profile request, if it is identified that the profile is ready in the profile providing server 530, a profile download screen 820 may be displayed. For example, the profile download screen 820 may include a query screen 821 (e.g., "Add the plan to your phone?") for profile download progress and may further include a related description (e.g., "This will let your phone connect to Carrier's network"). When the user selects the identify button 822 (e.g., "Add and use it now") to request download on the query screen 821 for profile download progress, the profile download request to the profile providing server 530 may be performed. According to various embodiments of the disclosure, the status bar 810 or 820 illustrated in FIG. 8A or 8B may be referred to as a navigation bar, a quick panel, a notification bar, or a pop-up window but is not limited thereto. For example, in operation 620, the electronic device 101 may download the profile from the profile providing server 530 by selecting the confirm button 822 to request download shown in FIG. 8B. According to various embodiments of the disclosure, the electronic device 101 may obtain the IP address from the domain name server using the FQDN address of the profile providing server included in the profile download information and request to provide a profile to the IP address. According to various embodiments of the disclosure, the electronic device 101 may directly transfer the profile installation key to the profile providing server 530 or, after authenticating the profile providing server 530 through the authentication server 540, provide an installation key to the profile providing server 530.

According to various embodiments of the disclosure, the profile providing server 530 may perform the authentication process and then, in operation 620, download the profile to the electronic device 101. In operation 622, the electronic device 101 may download and install the profile to the eSIM 201 (e.g., eUICC). The electronic device 101 may activate the profile after installing the profile. Through profile activation, a subscription, an opening, or a subscription transfer procedures for using a communication service through profile download to the electronic device 101 may be complete. The electronic device 101 may use the mobile communication network after authentication with the mobile communication system using the profile installed in the eSIM 201.

According to various embodiments of the disclosure, the profile providing server 530 may be a server operated by the mobile communication carrier or the manufacturer of the eSIM 201 (or eUICC), and the profile information transfer server 520 may be a server operated by the mobile communication carrier or the manufacturer of the eUICC or electronic device. In the profile download using eUICC, it may not be determined which network operator's profile to download when manufacturing the eUICC. For example, the profile may be determined depending on which network operator's communication service the user subscribes to. For example, the user must access a server operated by the network operator of the communication service subscribed to and download a profile. However, since such information is not known when eUICC is created, the address of the profile providing server 530 may be obtained for profile download as described above.

According to various embodiments of the disclosure, when a push message is not transmitted in operation 612, the electronic device 101 may be unaware whether the profile provision server 530 is ready for the profile and keeps waiting for a push message, thus failing to normally download a profile. Since the communication carrier may be unaware of whether the electronic device normally receives the push message, it does not retransmit a push message, and the electronic device may end up indefinitely waiting for a push message.

According to various embodiments described below, even when the electronic device fails to normally receive a push message indicating that a profile is ready, it may normally download a profile by allowing a profile check request to be performed through a status bar (e.g., a notification bar) as in embodiments described below.

Figure 9:
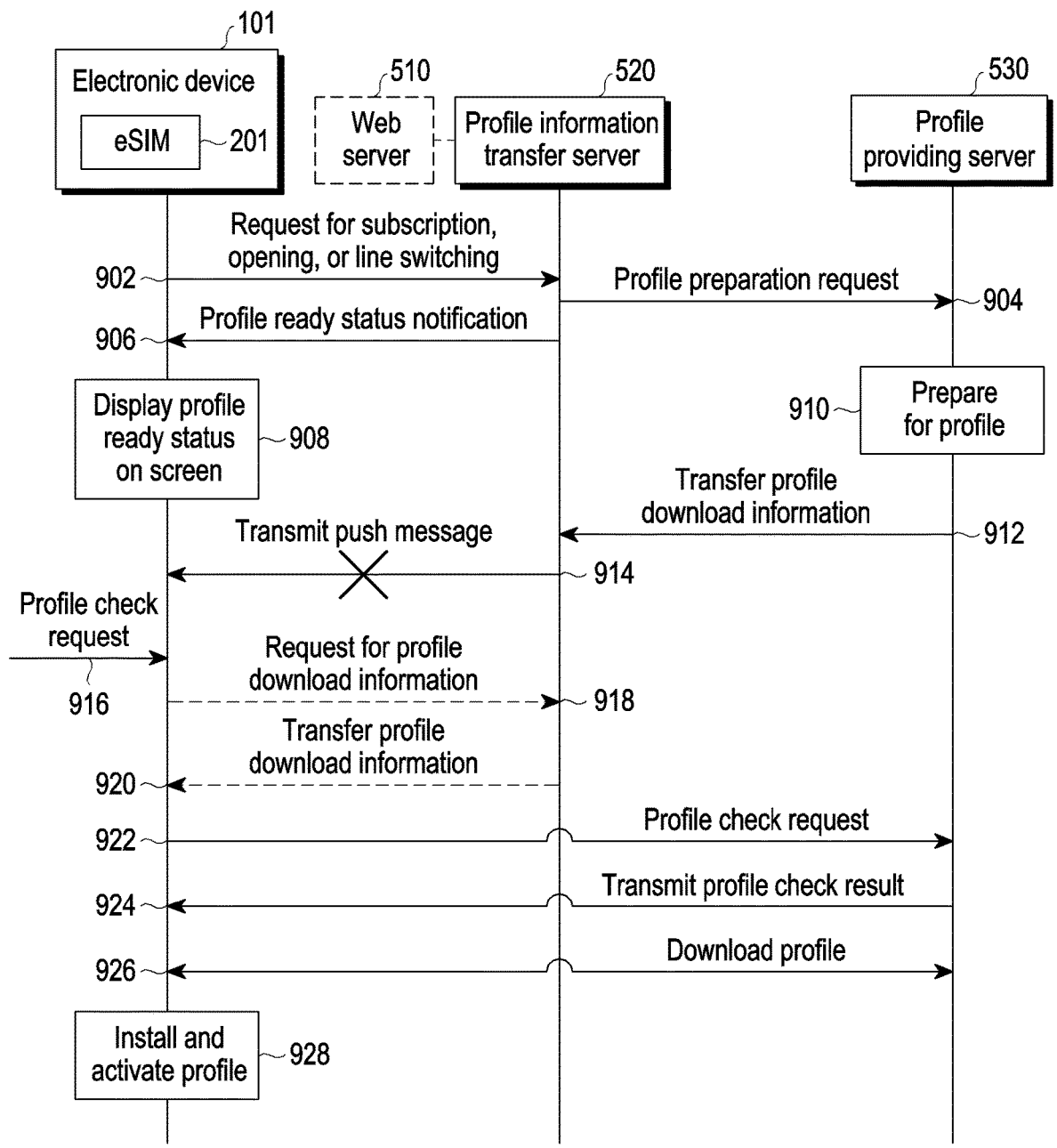
FIG. 9 is a flowchart illustrating a method for downloading a profile according to an embodiment of the disclosure.

FIG. 9 is a flowchart illustrating a method for downloading a profile according to an embodiment of the disclosure. In FIG. 9, no detailed description of the same or similar operations to those of FIG. 6 is given.

Referring to FIG. 9, according to various embodiments of the disclosure, the electronic device 101 may access the web server 510 through the profile information transfer server 520 of the communication carrier server 500. For example, when the electronic device 101 accesses the profile information transfer server 520, the profile information transfer server 520 may authenticate the electronic device 101 or the user of the electronic device 101 through the authentication server 540 and perform an eligibility check. If the electronic device 101 or the user of the electronic device 101 is normally authenticated and determined to be eligible, the profile information transfer server 520 may transmit information for accessing the web server 510 to the electronic device 101. The electronic device 101 may access the web server 510 using the information for accessing the web server 510 received through the profile information transfer server 520. According to various embodiments of the disclosure, the electronic device 101 may request a subscription, an opening, or a subscription transfer through a web page provided by the web server 510 and, according to another embodiment of the disclosure, may request a subscription, an opening or a subscription transfer through the profile information transfer server 520 without the web server 510. In operation 902, the electronic device 101 may request a new eSIM profile or request a subscription, an opening, or a subscription transfer to a new communication service through a web page provided by the web server 510. For example, the electronic device 101 may transmit a message including a subscription-related operation (e.g., a subscription, an opening, or a subscription transfer) through the web page provided by the web server 510 and, according to various embodiments of the disclosure, the transmission of the message including the subscription-related operation may follow the procedure set forth in the GSMA standard document TS but is not limited thereto. According to various embodiments of the disclosure, the profile information transfer server 520 of the communication carrier server 500 may authenticate the electronic device 101 or the user of the electronic device 101 through the authentication server 540.

According to various embodiments of the disclosure, in operation 904, the profile information transfer server 520 may request the profile providing server 530 to prepare for a profile in response to the request for the subscription-related operation (e.g., a subscription, an opening, or a subscription transfer) through the electronic device 101. Information transmitted from the profile information transfer server 520 to the profile providing server 530 according to the profile preparation request may include an eUICC differentiator (e.g., eUICC identifier (EID)), information about the profile information transfer server, a profile differentiator or profile request time, profile installation key, information about the electronic device 101, or eUICC information.

According to various embodiments of the disclosure, the profile information transfer server 520 may notify the electronic device 101 of the profile ready status while the profile providing server 530 prepares for a profile in operation 906. The message for notifying of the profile ready status may include a callback message (e.g., a JS callback message). For example, the callback message may be transmitted when the electronic device 101 terminates the web page provided by the web server 510, but is not limited thereto.

According to various embodiments of the disclosure, the callback message transmitted from the profile information transfer server 520 to the electronic device 101 may be implemented in the form of "onPlanSelectionCompleted (ServiceStatus=9, smdpAddress or Activation Code)". The callback message may include service status information, the address of the profile providing server (e.g., subscription manager data preparation platform (SM-DP)+220) 530, or an activation code. For example, the service status information (ServiceStatus) may be represented as 9 to indicate that the profile is delayed, and the service status information may be represented as 1 to indicate that profile is ready. According to various embodiments of the disclosure, the activation code may include information corresponding to the address of the profile providing server 530. The electronic device 101 may identify the address of the profile providing server 530 based on the activation code.

Figure 10:
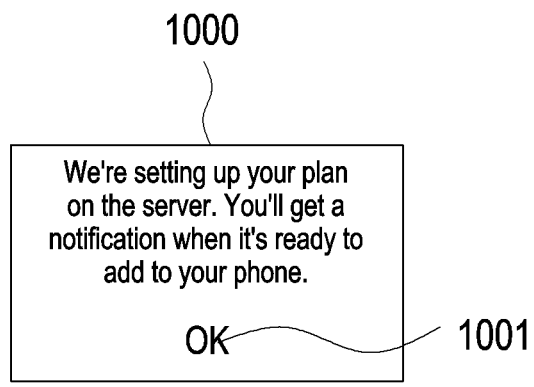
FIG. 10 is a view illustrating a user interface displayed on a screen of an electronic device according to an embodiment of the disclosure.
Figure 11:
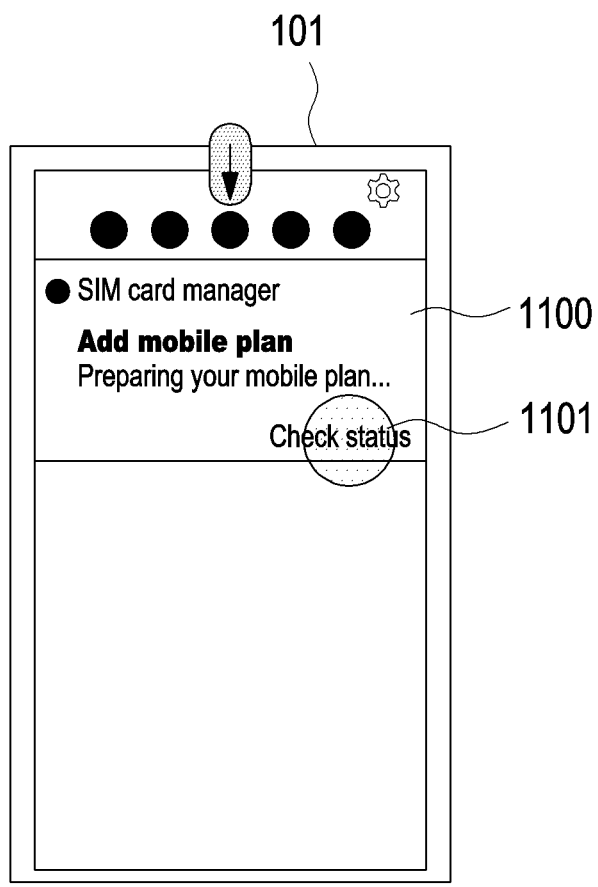
FIG. 11 is a view illustrating a user interface displayed on a screen of an electronic device according to an embodiment of the disclosure.

FIG. 10 is a view illustrating a user interface displayed on a screen of an electronic device according to an embodiment of the disclosure. FIG. 11 is a view illustrating a user interface displayed on a screen of an electronic device according to an embodiment of the disclosure.

Referring to FIGS. 10 and 11, according to various embodiments of the disclosure, if the electronic device 101 identifies that the profile is in a delayed status because the profile is not ready through the service status information included in the callback message, the electronic device 101 may display the profile ready status on the screen in operation 908. For example, the electronic device 101 may display a message (e.g., "We're setting up your plan on the server. You'll get a notification when it's ready to add to your phone") indicating the profile delayed status on the screen through a pop-up window 1000 as shown in FIG. 10. The pop-up window 1000 may include a confirm button 1001 (e.g., "OK"), and when the user selects the confirm button 1001, a notification screen 1100 shown in FIG. 11 may be displayed on the screen of the electronic device 101. For example, the notification screen 1100 may include a status check button 1101 (e.g., "Check status") capable of identifying the profile download status. A description of the status check button 1101 is described below.

According to various embodiments of the disclosure, the profile providing server 530 may prepare for a profile in operation 910. For example, when the profile identifier (e.g., ICCID) value is transferred to the profile preparation request, the profile providing server 530 may prepare for a profile corresponding to the profile identifier.

According to various embodiments of the disclosure, in operation 912, the profile providing server 530 may transfer profile download information to the profile information transfer server 520. The transfer of the profile download information may mean registering the profile download information with the profile information transfer server 520. The profile information transfer server 520 may receive the profile download information and register the received profile download information. When so registered, the profile download information may be stored in the profile information transfer server 520. For example, the profile download information may include at least one of the address of the profile providing server 530, profile installation key, or eUICC information. The address of the profile providing server 530 may include at least one of a server address in the form of a full qualified domain name (FQDN), an address in the form of a full uniform resource locator (URL), or an internet protocol (IP) server address. The eUICC information may be a specific EID or a value or EID in which a hash function operation result is provided to the specific EID. The hash function operation for the EID means a calculation included in the hash operation. For example, the hash function may be performed on the EID once or twice, or passcode information, along with the EID, as factors of the hash function may be added. The passcode may be a value transferred to the user.

According to various embodiments of the disclosure, if the profile download information is transferred or registered to the profile information transfer server 520, the profile download information may be transferred to the electronic device 101 connected to the eUICC corresponding to the eUICC information.

According to various embodiments of the disclosure, if profile download is ready in the profile providing server 530, the profile information transfer server 520 of the communication carrier server 500 may transfer the profile download information to the electronic device 101 through a push message in operation 914. For example, the profile information transfer server 520 may transfer the push message to the electronic device 101 through a web push server (not shown). The electronic device 101 may receive the push message and identify that the profile download is ready.

According to various embodiments of the disclosure, the push message may not be normally transferred to the electronic device 101 depending on the status of the network or the status of the communication carrier server 500. When a push message is not transmitted in operation 914, the electronic device 101 may be unaware whether the profile provision server 530 is ready for the profile and keep waiting for a push message.

According to various embodiments of the disclosure, since the electronic device 101 keeps maintaining the notification screen 1100 shown in FIG. 11 even when it does not receive the push message, it may identify the profile ready status through the notification screen 1100. For example, when the user selects the status check button 1101 (e.g., "Check status") of the notification screen 1100, the electronic device 101 may determine the selection of the check button 1101 as a profile check request in operation 916. According to various embodiments of the disclosure, according to the profile check request, the electronic device 101 may transmit the profile check request to the profile providing server 530 in operation 922. The profile check request may be implemented in the form of "Poll SM-DP+", but is not limited thereto. According to various embodiments of the disclosure, the electronic device 101 may transmit a profile check request to the profile providing server 530 periodically or when a set condition is met, in operation 922.

According to various embodiments of the disclosure, when the address of the profile providing server 530 is not stored in the memory (e.g., the memory 130 of FIG. 1A) of the electronic device 101 or the address of the profile providing server 530 is not received from the profile information transfer server 520, the electronic device 101 may send a request for profile download information to the profile information transfer server 520 in operation 918. The profile information transfer server 520 may transfer the profile download information to the electronic device 101 in response to the request in operation 920. The profile download information transmitted from the profile information transfer server 520 to the electronic device 101 may include information (e.g., an FQDN-type server address, a full URL-type address, or IP server address or activation code) corresponding to the address of the profile providing server 530.

According to various embodiments of the disclosure, when the address of the profile providing server 530 is stored in the memory (e.g., the memory 130 of FIG. 1A) of the electronic device 101, operations 918 and 920 may be omitted. For example, when receiving a callback message (e.g., a JS callback message) indicating the profile ready status from the profile information transfer server 520 in operation 906 described above, the electronic device 101 may identify address information about the profile providing server (e.g., the SM-DP+ 220) 530 included in the callback message and store the address information about the profile providing server 530 in the memory (e.g., the memory 130 of FIG. 1A).

According to various embodiments of the disclosure, if the electronic device 101 transmits the profile check request to the profile providing server 530 in operation 922, the profile providing server 530 may transmit a profile check result to the electronic device 101 in operation 924. For example, when the profile is ready in the profile providing server 530, a message (e.g., "Success to Poll SM-DP+") corresponding to the profile being ready may be transmitted as the profile check result. In contrast, if the profile is not ready in the profile providing server 530, a message (e.g., "Fall to Poll SM-DP+") corresponding to profile preparation being delayed may be transmitted as the profile check result.

According to various embodiments of the disclosure, when the electronic device 101 receives the message (e.g., "Success to Poll SM-DP+") corresponding to profile being ready as the profile check result, the profile download screen 820 described above in connection with FIG. 8B may be displayed. For example, the profile download screen 820 may include a query screen 821 (e.g., "Add the plan to your phone?") for profile download progress and may further include a related description (e.g., "This will let your phone connect to Carrier's network"). When the user selects the identify button 822 (e.g., "Add and use it now") to request download on the query screen 821 for profile download progress, the profile download request to the profile providing server 530 may be performed.

According to various embodiments of the disclosure, if the electronic device 101 determines that the profile is ready according to the transmitted profile check result in operation 924, the electronic device 101 may download the profile from the profile providing server 530 in operation 926. According to various embodiments of the disclosure, the electronic device 101 may download and install the profile to the eSIM 201 (e.g., eUICC). The electronic device 101 may activate the profile after installing the profile in operation 928. Through profile activation, an opening procedure for using a communication service through profile download to the electronic device 101 may be complete. The electronic device 101 may use the mobile communication network after authentication with the mobile communication system using the profile installed in the eSIM 201.

Figure 12A:
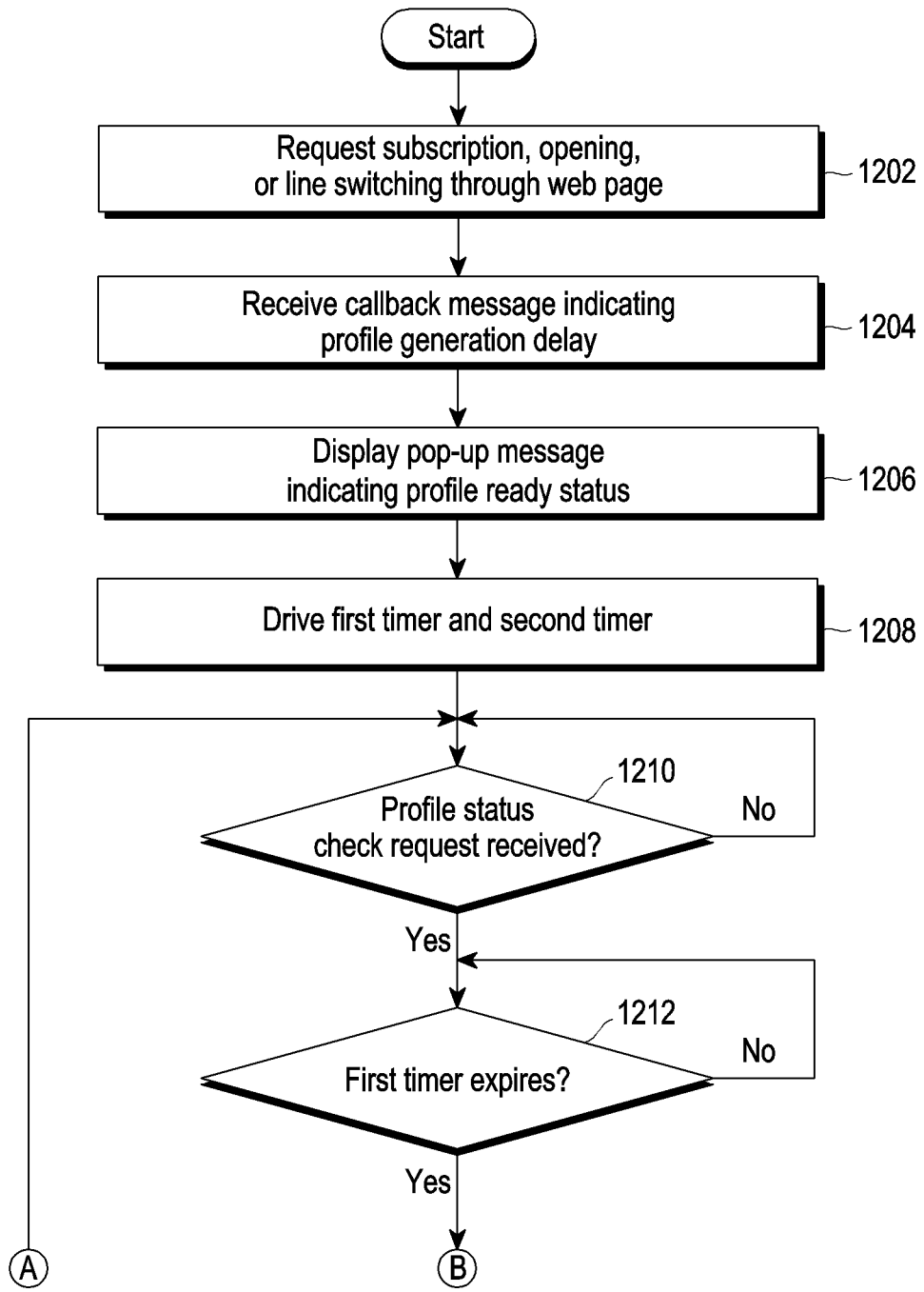
FIGS. 12A and 12B are flowcharts illustrating a method for downloading a profile according to various embodiments of the disclosure.
Figure 12B:
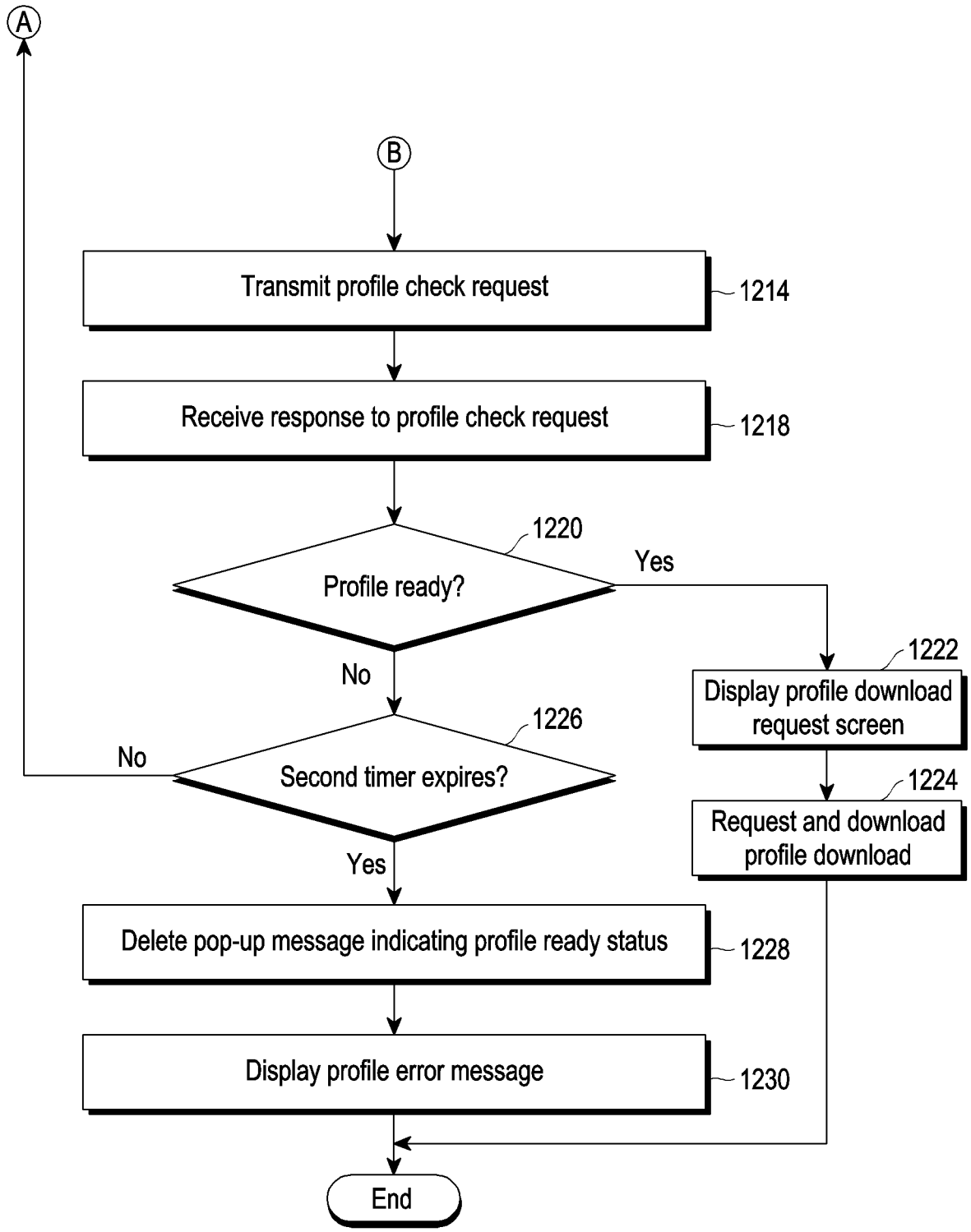

FIGS. 12A and 12B are flowcharts illustrating a method for downloading a profile according to various embodiments of the disclosure.

Referring to FIGS. 12A and 12B, the electronic device 101 (e.g., the processor 120 of FIG. 1A) may request a subscription, an opening, or a subscription transfer through a web page in operation 1202.

According to various embodiments of the disclosure, the electronic device 101 may receive a callback message indicating a profile generation delay in operation 1204. Based on the received callback message, the electronic device 101 may display a pop-up message (e.g., a notification screen) indicating a profile ready status in operation 1206. For example, the electronic device 101 may display the notification screen shown in FIGS. 10 and 11.

According to various embodiments of the disclosure, in operation 1208, the electronic device 101 may drive a first timer and a second timer. The first timer may include a timer set to prevent the profile check request from being repeatedly performed within a predetermined time. The second timer may include a timer for setting the duration of the notification screen shown in FIG. 11. For example, the first timer may be set to 1 minute, and the second timer may be set to 24 hours, but this is not limited thereto.

According to various embodiments of the disclosure, the electronic device 101 may determine whether a profile status check request input from the user is received in operation 1210 according to selection of the status check button 1101 (e.g., "Check status") of FIG. 11. If it is determined in operation 1210 that the profile status check request is not received (No in operation 1210), the electronic device may wait until the profile status check request is received. When a profile status check request is received in operation 1210 (Yes in operation 1210), the electronic device 101 may identify whether the first timer expires in operation 1212. According to various embodiments of the disclosure, the driving of the first timer may be started when the status check button 1101 (e.g., "Check status") of FIG. 11 is selected. When the first timer does not expire in operation 1212 (No in operation 1212), the electronic device 101 may wait until the first timer expires. When the first timer expires (Yes in operation 1212), the electronic device 101 may transmit a profile check request to the profile providing server 530 in operation 1214.

According to various embodiments of the disclosure, when the status check button 1101 of FIG. 11 is selected again after the first timer expires, the first timer may be driven again as described above.

According to various embodiments of the disclosure, the electronic device 101 may receive a response to the profile check request from the profile providing server 530 in operation 1218. Based on the response to the profile check request, the electronic device 101 may determine whether a profile is ready in operation 1220. As a result of the determination in operation 1220, if it is determined that the profile is ready (Yes in operation 1220), the electronic device 101 may display a profile download request screen as shown in FIGS. 8A and 8B in operation 1222. The electronic device 101 may send a request for profile download to the profile providing server 530 in operation 1224 and may download the corresponding profile.

As a result of the determination in operation 1220, if it is determined that the profile is not ready (No in operation 1220), the electronic device 101 may determine whether the second timer expires in operation 1226. As a result of the determination, if the second timer does not expire (No in operation 1226), the electronic device 101 may keep displaying the pop-up message indicating the profile ready status being displayed in operation 1206 and proceed to operation 1210. As a result of the determination, if the second timer expires (Yes in operation 1226), the electronic device 101 may delete the pop-up message indicating the profile ready status in operation 1228 and may display a profile error message 1300 as shown in FIG. 13 in operation 1230.

Figure 13:
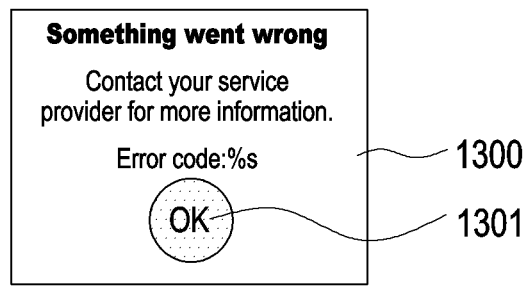
FIG. 13 is a view illustrating a user interface displayed on a screen of an electronic device according to an embodiment of the disclosure.

FIG. 13 is a view illustrating a user interface displayed on a screen of an electronic device according to an embodiment of the disclosure.

Referring to FIG. 13, a profile error message 1300 may include a message (e.g., "Something went wrong") indicating that the profile is not normally downloaded and may include a confirm button 1301.

Figure 14:
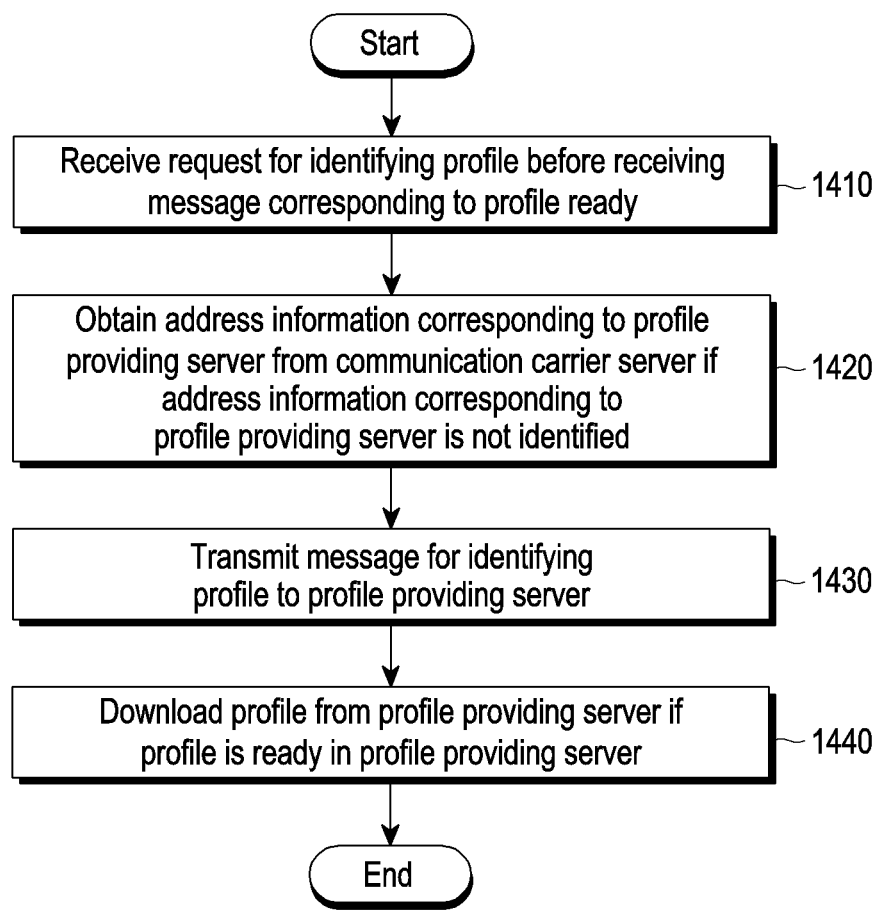
FIG. 14 is a flowchart illustrating a method for downloading a profile according to an embodiment of the disclosure.

FIG. 14 is a flowchart illustrating a method for downloading a profile according to an embodiment of the disclosure.

Referring to FIG. 14, according to various embodiments of the disclosure, the electronic device 101 (e.g., the processor 120 of FIG. 1A) may receive a request for identifying a profile (or a profile check request) before receiving a message corresponding to profile being ready (or in a state in which a push message corresponding to profile being ready is not received) in operation 1410. For example, the request for identifying a profile may be received through a user interface (e.g., the screen 1100 of FIG. 11) displayed on the display (e.g., the display module 160 of FIG. 1A) of the electronic device 101.

According to various embodiments of the disclosure, in operation 1420, unless address information corresponding to the profile providing server is not identified, the electronic device 101 may obtain information (e.g., FQDN-type server address, full URL-type address, or IP server address, or activation code) corresponding to the address of the profile providing server (e.g., the profile providing server 530 of FIG. 5) from the communication carrier server.

According to various embodiments of the disclosure, in operation 1430, the electronic device 101 may transmit a message for identifying a profile to the profile providing server. According to various embodiments of the disclosure, if the profile providing server is a profile ready status according to the transmission of the profile check request, the electronic device 101 may download the profile from the profile providing server in operation 1440.

Figure 15:
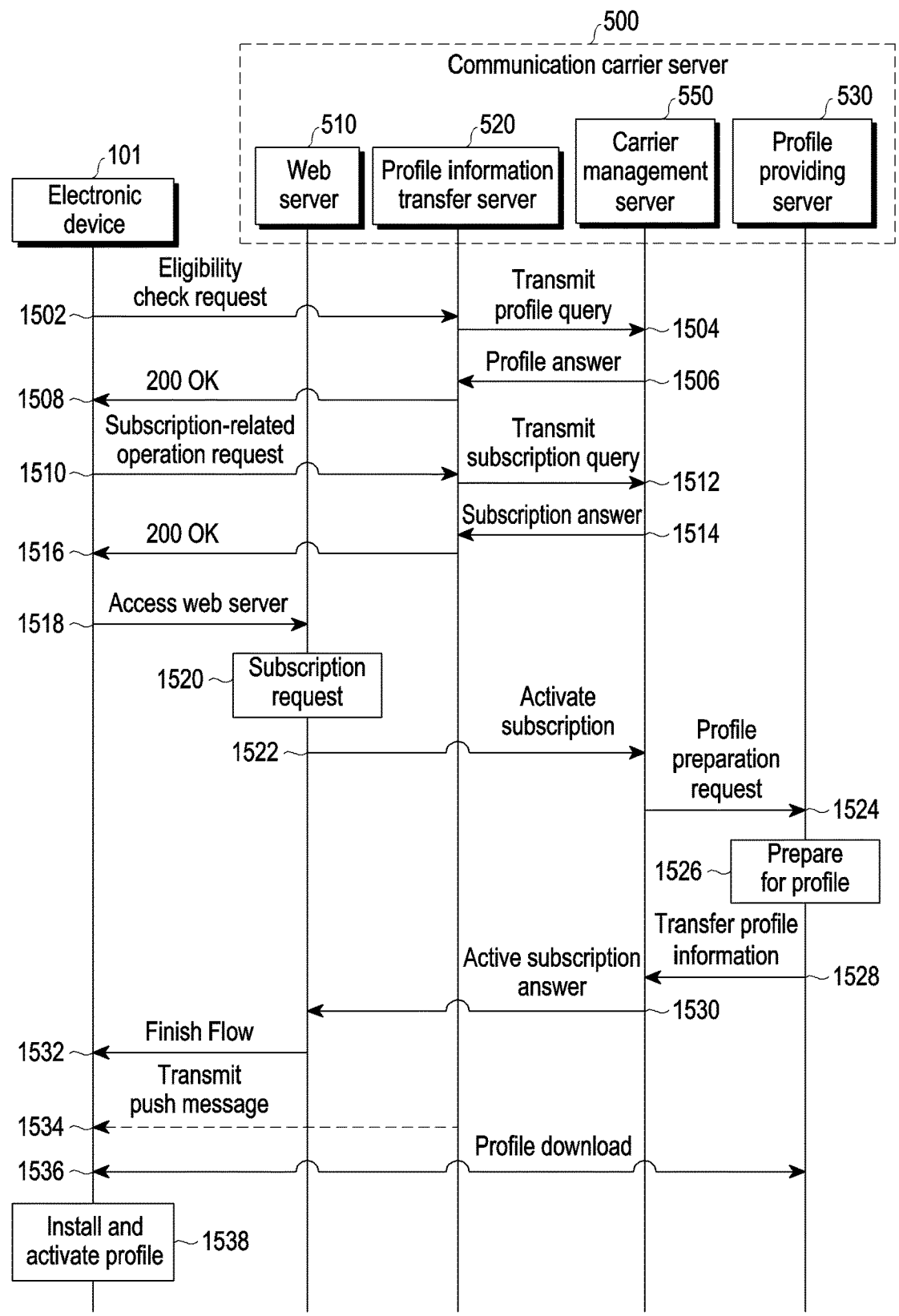
FIG. 15 is a flowchart illustrating a method for downloading a profile according to an embodiment of the disclosure.

FIG. 15 is a flowchart illustrating a method for downloading a profile according to an embodiment of the disclosure.

Referring to FIG. 15, according to various embodiments of the disclosure, the electronic device 101 may access the web server 510 through the profile information transfer server 520 of the communication carrier server 500. The electronic device 101 may request a new eSIM profile or request a subscription, an opening, or a subscription transfer to a new communication service through a web page provided by the web server 510. For example, the electronic device 101 may transmit a message including a subscription-related operation (e.g., a subscription, an opening, or a subscription transfer) through the web page provided by the web server 510 and, according to various embodiments of the disclosure, the transmission of the message including the subscription-related operation may follow the procedure set forth in the GSMA standard document TS but is not limited thereto.

For example, in operation 1502, the electronic device 101 may send a request for an eligibility check to the profile information transfer server 520 (e.g., an entitlement server) according to the procedure set forth in the standard document TS. 43. The request for an eligibility check may be transmitted in a GET scheme or POST scheme. For example, the electronic device 101 may include any one of the ODSA operations shown in Table 2 below in a request message and transmit the request message to the profile information transfer server 520 according to the on-device service activation (ODSA) procedure set forth in the standard document TS. 43.

TABLE 2

| ODSA operation | Description |
| --- | --- |
| CheckEligibility | To verify if end-user is allowed to invoke the ODSA application |
| ManageSubscription | To request for subscription-related action on a primary or companion device. |
| ManageService | To activate/deactivate the service on the primary or companion device. |
| AcquireConfiguration | To provide service-related data about a primary or companion device |
| AcquirePlan | To request available plans to be offered by the MNO to a specific user or MDM |

Referring to Table 2 above, in operation 1502, the electronic device 101 may request an eligibility check by transmitting a request message, which includes "CheckEligibility" as operation information, to the profile information transfer server 520 (e.g., an entitlement server) according to the procedure set forth in the standard document TS. 43. According to various embodiments of the disclosure, the request message for the eligibility check may further include identification information (e.g., IMEI or UUID) or an authentication token of the electronic device 101.

According to various embodiments of the disclosure, the profile information transfer server 520 may transmit a profile query to the carrier management server 550 (e.g., BSS or OSS) in operation 1504. The profile query may include subscription identification information (e.g., "SubscriptionID"). The carrier management server 550 may transmit a profile answer to the profile information transfer server 520 in response to receiving the profile query in operation 1506. In operation 1508, the profile information transfer server 520 may transmit a response message (e.g., a "200 OK" message) for the eligibility check request to the electronic device 101 in response to the reception of the profile answer. For example, when the eligibility check of the electronic device 101 is normally complete, the response message may indicate that the status information about the electronic device 101 is displayed as "enabled".

According to various embodiments of the disclosure, if the eligibility check is complete, the electronic device 101 may request a subscription, an opening, or a subscription transfer by transmitting, to the profile information transfer server 520 (e.g., an entitlement server), a subscription-related operation request message including "ManageSubscription" in Table 2 above, as operation information according to the procedure set forth in the standard document TS. 43 in operation 1510. According to various embodiments of the disclosure, the subscription-related operation request message may further include identification information (e.g., IMEI or UUID) or an authentication token of the electronic device 101. According to various embodiments of the disclosure, the subscription-related operation request message may further include type information of Table 3 below as parameter information.

TABLE 3

| Parameter | type | Values | Description |
| --- | --- | --- | --- |
| Operation type | Integer | 0-SUBSCRIBE | to activate a subscription for the eSIM device. |
| | | 1-UNSUBSCRIBE | to cancel a subscription for the eSIM device. |
| | | 2-CHANGE SUBSCRIPTION | to manage an existing subscription on the eSIM device. |
| | | 3-TRANSFER SUBSCRIPTION | to transfer a subscription from an existing device (with physical SIM or eSIM) to the eSIM device |
| | | 4-UPDATE SUBSCRIPTION | to inform the network of a subscription update on the eSIM device |

Referring to Table 3, the subscription-related operation request message including "ManageSubscription" of Table 2 above, as operation information may include at least one parameter of "SUBSCRIBE", "UNSUBSCRIBE", "CHANGE SUBSCRIPTION", "TRANSFER SUBSCRIPTION", or "UPDATE SUBSCRIPTION". For example, when the subscription-related operation request message includes the "SUBSCRIBE", it may be a request for activating a subscription to the eSIM. When the subscription-related operation request message includes the "UNSUB- SCRIBE", it may be a request for canceling the subscription to the eSIM. When the subscription-related operation request message includes the "CHANGE SUBSCRIPTION", it may be a request for managing subscription information present in the eSIM. When the subscription-related operation request message includes the "TRANSFR SUBSCRIPTION", it may be a request for transferring the subscription information present in the eSIM to another electronic device 101 or another eSIM. When the subscription-related operation request message includes the "UPDATE SUBSCRIPTION", it may be a request for notifying the communication network of subscription information update for the eSIM.

According to various embodiments of the disclosure, the profile information transfer server 520 may transmit a subscription query to the carrier management server 550 (e.g., BSS or OSS) in operation 1512. The subscription query may include subscription identification information (e.g., "SubscriptionID") or IMEI. The carrier management server 550 may transmit a subscription answer message to the profile information transfer server 520 in response to the reception of the subscription query in operation 1514. According to various embodiments of the disclosure, the subscription answer message may include address information (e.g., URL information) for accessing the web server 510. In operation 1516, the profile information transfer server 520 may transmit a response message (e.g., a "200 OK" message) to the subscription-related operation request to the electronic device 101 in response to the subscription answer message.

According to various embodiments of the disclosure, the response message to the subscription-related operation request may further include the subscription result information ("SubscriptionResult") of Table 4 below, as parameter information.

TABLE 4

| Parameter | type | Values | Description |
|---|---|---|---|
| Subscription-Result | Integer | 1-CONTINUE TO WEBSHEET | Indicates that end-user must go through the subscription web view procedure, using information included below. |
| | | 2-DONWLOAD PROFILE | Indicates that a communication profile must be downloaded by the eSIM device, with further information included in response |
| | | 3-DONE | Indicates that subscription flow has ended and the end-user has already downloaded the profile so there is no need to perform any other action. This value is only present as part of the ManageSubscription request where operation_type = "4-UPDATE SUBSCRIPTION" |
| | | 4-DELAYED DOWNLOAD | Indicates that a profile is not ready to be downloaded when a user request to transfer subscription or to add the new subscription through native UX on the eSIM device. |

According to various embodiments of the disclosure, referring to Table 4, the response message (e.g., "200 OK" message) to the subscription-related operation request may include at least one parameter of "CONTINUE TO WEBSHEET", "DOWNLOAD PROFILE", "DONE", or "DELAYED DOWNLOAD". For example, when the type information included in the subscription-related operation request message of operation 1510 described above corresponds to "SUBSCRIBE" or "CHANGE SUBSCRIPTION", a response message (e.g., "200 OK" message) to the subscription-related operation request of operation 1516 may include at least one parameter among "CONTINUE TO WEBSHEET", "DOWNLOAD PROFILE", and "DELAYED DOWNLOAD". When the type information included in the subscription-related operation request message of operation 1510 described above corresponds to "UPDATE SUBSCRIPTION", the response message (e.g., "200 OK" message) to the subscription-related operation request of operation 1516 may include "DONE" as a parameter.

According to various embodiments of the disclosure, referring to Table 4, when the response message to the subscription-related operation request in operation 1516 includes the "CONTINUE TO WEBSHEET", address information (e.g., URL) for accessing the web server 510 may be further included. When the response message to the subscription-related operation request of operation 1516 includes the "DOWNLOAD PROFILE", the profile providing server 530 is in a profile ready status, and address information about the profile providing server 530 may be further included. When the response message to the subscription-related operation request of operation 1516 includes the "DONE", the profile has been already downloaded to the electronic device 101 so that no further operation may be required.

According to various embodiments of the disclosure, when the response message to the subscription-related operation request in operation 1516 includes the "DELAYED DOWNLOAD", it may indicate that a profile is not yet ready in the profile providing server 530. According to various embodiments of the disclosure, the embodiment of FIG. 15 is an embodiment in which subscription is requested through a web page provided from the web server 510. The response message to the subscription-related operation request may include the "CONTINUE TO WEBSHEET" and may further include address information (e.g., URL information) for accessing the web server 510.

According to various embodiments of the disclosure, in operation 1518, the electronic device 101 may access the web server 510 based on the address information for accessing the web server 510 included in the response message to the subscription-related operation request from the profile information transfer server 520. In operation 1520, the electronic device 101 may request a subscription through the web page provided from the web server 510. In operation 1522, the web server 510 may transmit an active subscription message to the carrier management server 550 based on the subscription information requested from the electronic device 101. In operation 1524, the carrier management server 550 may send a request for profile preparation to the profile providing server 530 to prepare for a profile corresponding to the request from the electronic device 101, in response to reception of the active subscription message. In operation 1526, the profile providing server 530 may prepare for a profile in response to the request. In operation 1528, the profile providing server 530 may transfer profile information to the carrier management server 550. For example, the profile information may include profile ready status-related information (e.g., profile download ready or profile download delayed).

According to various embodiments of the disclosure, in operation 1530, the carrier management server 550 may transmit, to the web server 510, an active subscription answer message in response to the active subscription request from the web server 510. In operation 1532, the web server 510 may transmit a finish flow message to the electronic device 101. According to various embodiments of the disclosure, the profile information transfer server 520 may notify the electronic device 101 of the profile ready status while the profile providing server 530 prepares for a profile as described above in connection with FIG. 6. The message for notifying of the profile ready status may include a callback message (e.g., a java script (JS) callback message). For example, the callback message may be transmitted when the electronic device 101 terminates the web page provided by the web server 510, but is not limited thereto.

According to various embodiments of the disclosure, the callback message transmitted from the profile information transfer server 520 to the electronic device 101 may be implemented in the form of "onPlanSelectionCompleted (ServiceStatus=9, smdpAddress or Activation Code)". The callback message may include service status information, the address (or address information) of the profile providing server (e.g., SM-DP+ 220) 530, or an activation code. For example, the service status information (ServiceStatus) may be represented as 9 to indicate that the profile is delayed, and the service status information may be represented as 1 to indicate that profile is ready. According to various embodiments of the disclosure, the activation code may include information corresponding to the address of the profile providing server 530. The electronic device 101 may identify the address of the profile providing server 530 based on the activation code.

According to various embodiments of the disclosure, if the electronic device 101 identifies that the profile is in a delayed status because the profile is not ready through the service status information included in the callback message, the electronic device 101 may display the profile ready status on the screen as described above. For example, the electronic device 101 may display a message (e.g., "We're setting up your plan on the server. You'll get a notification when it's ready to add to your phone") indicating the profile delayed status on the screen through a pop-up window 1000 as described above in connection with FIG. 10. The pop-up window 1000 may include a confirm button 1001 (e.g., "OK"), and when the user selects the confirm button 1001, the notification screen 1100 shown in FIG. 11 may be displayed on the screen of the electronic device 101. For example, the notification screen 1100 may include a status check button 1101 (e.g., "Check status") capable of identifying the profile download status.

According to various embodiments of the disclosure, the profile information transfer server 520 of the communication carrier server 500 may notify the electronic device 101 that profile download is ready in operation 1534. For example, the profile information transfer server 520 may transfer the push message to the electronic device 101 through a web push server (not shown). According to various embodiments of the disclosure, the push message may be implemented in the form shown in Table 1 above.

According to various embodiments of the disclosure, in operation 1536, the electronic device 101 may download the profile from the profile providing server 530 based on the address information about the profile providing server 530. In operation 1538, the electronic device 101 may install the profile in the eSIM 201 (e.g., eUICC) and activate the installed profile. Through profile activation, a subscription, an opening, or a subscription transfer procedures for using a communication service through profile download to the electronic device 101 may be complete. The electronic device 101 may use the mobile communication network after authentication with the mobile communication system using the profile installed in the eSIM 201.

As described above in connection with FIG. 15, the electronic device 101 may perform a subscription, an opening, or a subscription transfer procedure through the web page provided from the web server 510 provided from the communication carrier. According to various embodiments of the disclosure, a method in which the electronic device 101 performs a subscription, an opening, or a subscription transfer procedure when the communication carrier does not provide information related to the web server 510 (e.g., address information about the web server 510) is described in connection with FIGS. 16 and 17. In the following description of FIGS. 16 and 17, a description overlapping the description of FIG. 15 will be omitted.

Figure 16:
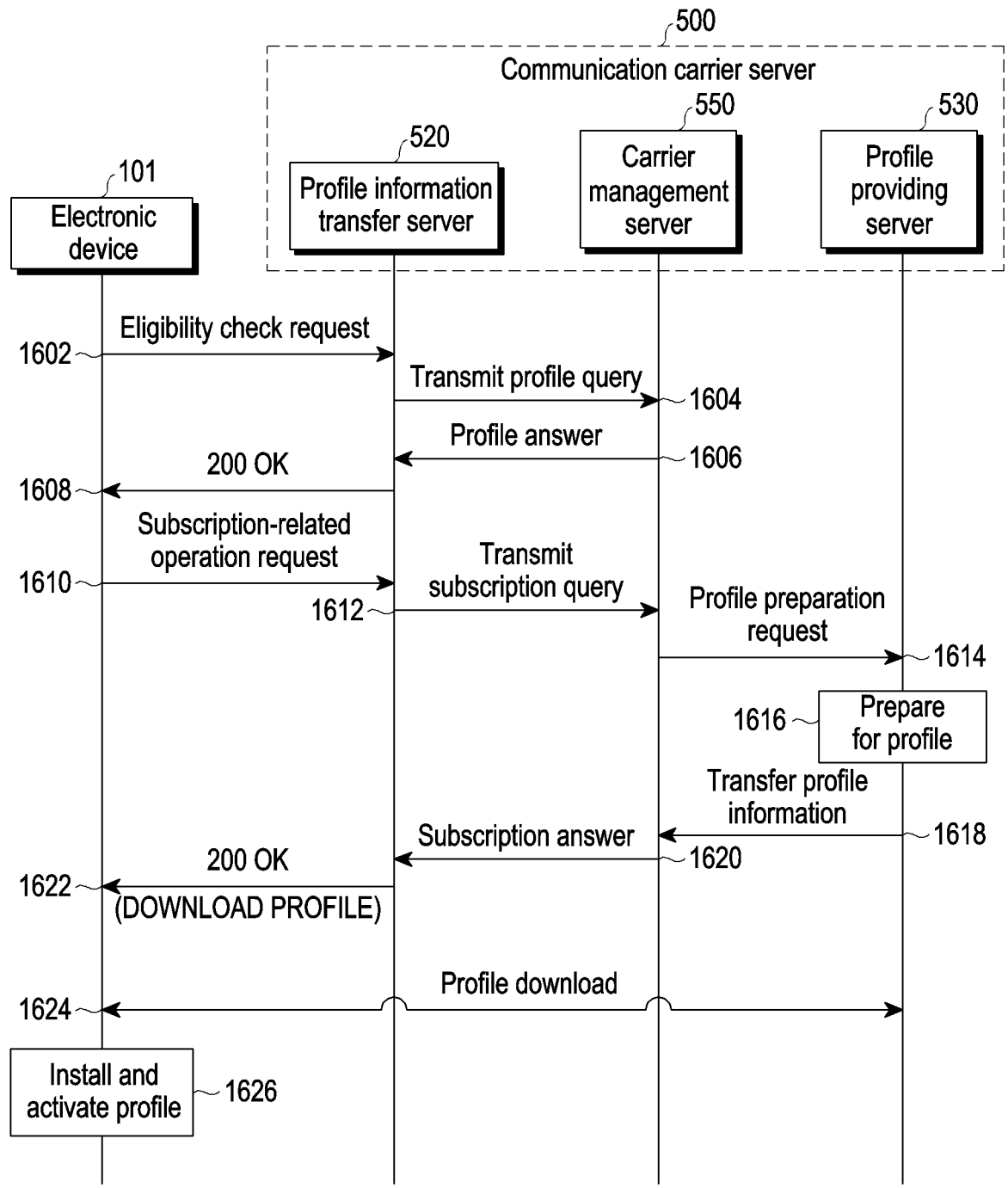
FIG. 16 is a flowchart illustrating a method for downloading a profile according to an embodiment of the disclosure.

FIG. 16 is a flowchart illustrating a method for downloading a profile according to an embodiment of the disclosure.

Referring to FIG. 16, according to various embodiments of the disclosure, the electronic device 101 may request a new eSIM profile through the profile information transfer server 520 of the communication carrier server 500 or request a subscription, an opening, or a subscription transfer to a new communication service. For example, the electronic device 101 may transmit a message including a subscription-related operation (e.g., a subscription, an opening, or a subscription transfer) to the profile information transfer server 520 and, according to various embodiments of the disclosure, the transmission of the message including the subscription-related operation may follow the procedure set forth in the GSMA standard document TS but is not limited thereto.

For example, in operation 1602, the electronic device 101 may send a request for an eligibility test to the profile information transfer server 520 (e.g., an entitlement server) according to the procedure set forth in the standard document TS. 43. The request for an eligibility check may be transmitted in a GET scheme or POST scheme. For example, the electronic device 101 may include any one of the ODSA operations shown in Table 2 above in a request message and transmit the request message to the profile information transfer server 520 according to the on-device service activation (ODSA) procedure set forth in the standard document TS. 43. For example, in operation 1602, the electronic device 101 may request an eligibility check by transmitting a request message, which includes "CheckEligibility" as operation information, to the profile information transfer server 520 (e.g., an entitlement server) according to the procedure set forth in the standard document TS. 43. According to various embodiments of the disclosure, the request message for the eligibility check may further include identification information (e.g., IMEI or UUID) or an authentication token of the electronic device 101.

According to various embodiments of the disclosure, the profile information transfer server 520 may transmit a profile query to the carrier management server 550 (e.g., BSS or OSS) in operation 1604. The profile query may include subscription identification information (e.g., "SubscriptionID"). The carrier management server 550 may transmit a profile answer to the profile information transfer server 520 in response to receiving the profile query in operation 1606. In operation 1608, the profile information transfer server 520 may transmit a response message (e.g., a "200 OK" message) for the eligibility check request to the electronic device 101 in response to the reception of the profile answer. For example, when the eligibility check of the electronic device 101 is normally complete, the response message may indicate that the status information about the electronic device 101 is displayed as "enabled".

According to various embodiments of the disclosure, if the eligibility check is complete, the electronic device 101 may request a subscription, an opening, or a subscription transfer by transmitting, to the profile information transfer server 520 (e.g., an entitlement server), a subscription-related operation request message including "ManageSubscription" in Table 2 above, as operation information according to the procedure set forth in the standard document TS. 43 in operation 1610. According to various embodiments of the disclosure, the subscription-related operation request message may further include identification information (e.g., IMEI or UUID) or an authentication token of the electronic device 101. According to various embodiments of the disclosure, the subscription-related operation request message may further include type information of Table 3 above as parameter information.

According to various embodiments of the disclosure, the profile information transfer server 520 may transmit a subscription query to the carrier management server 550 (e.g., BSS or OSS) in operation 1612. The subscription query may include subscription identification information (e.g., "SubscriptionID") or IMEI. In operation 1614, the carrier management server 550 may send a request for profile preparation to the profile providing server 530 to prepare for a profile corresponding to the subscription-related operation request from the electronic device 101, in response to reception of the subscription query. In operation 1616, the profile providing server 530 may prepare for a profile in response to the request. In operation 1618, the profile providing server 530 may transfer profile information to the carrier management server 550. For example, the profile information may include profile ready status-related information (e.g., profile download ready or profile download delayed).

According to various embodiments of the disclosure, in operation 1620, the carrier management server 550 may transmit, to the profile information transfer server 520, a subscription answer message in response to the transmission of the subscription query from the profile information transfer server 520. According to various embodiments of the disclosure, in operation 1622, the profile information transfer server 520 may transmit a response message (e.g., a "200 OK" message) to the subscription-related operation request to the electronic device 101 in response to the subscription answer message.

According to various embodiments of the disclosure, the response message to the subscription-related operation request may further include the subscription result information ("SubscriptionResult") of Table 4 above, as parameter information.

According to various embodiments of the disclosure, when the profile is ready in the profile providing server 530, the response message (e.g., "200 OK" message) to the subscription-related operation request may include the "DOWNLOAD PROFILE" as a parameter. According to various embodiments of the disclosure, when the response message (e.g., "200 OK" message) to the subscription-related operation request includes the "DOWNLOAD PROFILE" as a parameter, information for accessing the profile providing server 530 may be further included. For example, the information for accessing the profile providing server 530 may include the address (or address information) of the profile providing server (e.g., the SM-DS+ 220) 530 or an activation code for identifying the address information. According to various embodiments of the disclosure, the activation code may include any one of the activation codes set forth in the GSMA standard document TS. 43. For example, the activation code may include at least one of the address of the SM-DS+ 220 (530), an activation code token, or a subscription manager data preparation identification (SMDPid).

According to various embodiments of the disclosure, in operation 1624, the electronic device 101 may download the profile from the profile providing server 530 based on information for accessing the profile providing server 530 (e.g., the address (or address information) of the profile providing server (e.g., SM-DP+ 220 (530) or activation code for identifying the address information). In operation 1626, the electronic device 101 may install the profile in the eSIM 201 (e.g., eUICC) and activate the installed profile. Through profile activation, a subscription, an opening, or a subscription transfer procedures for using a communication service through profile download to the electronic device 101 may be complete. The electronic device 101 may use the mobile communication network after authentication with the mobile communication system using the profile installed in the eSIM 201.

Figure 17:
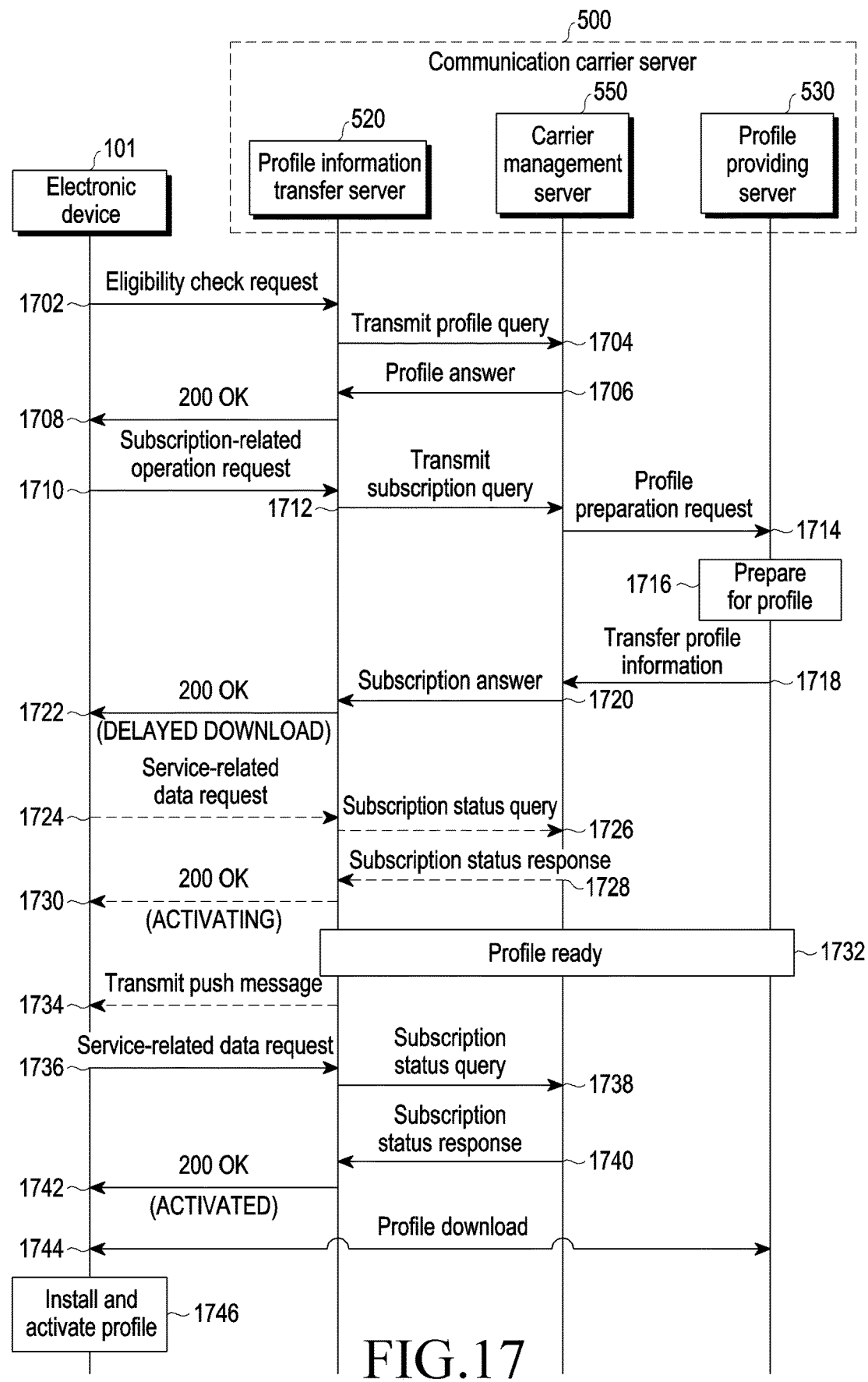
FIG. 17 is a flowchart illustrating a method for downloading a profile according to an embodiment of the disclosure.

FIG. 17 is a flowchart illustrating a method for downloading a profile according to an embodiment of the disclosure.

Referring to FIG. 17, according to various embodiments of the disclosure, the electronic device 101 may request a new eSIM profile through the profile information transfer server 520 of the communication carrier server 500 or request a subscription, an opening, or a subscription transfer to a new communication service. For example, the electronic device 101 may transmit a message including a subscription-related operation (e.g., a subscription, an opening, or a subscription transfer) to the profile information transfer server 520 and, according to various embodiments of the disclosure, the transmission of the message including the subscription-related operation may follow the procedure set forth in the GSMA standard document TS but is not limited thereto.

For example, in operation 1702, the electronic device 101 may send a request for an eligibility test to the profile information transfer server 520 (e.g., an entitlement server) according to the procedure set forth in the standard document TS. 43. The request for an eligibility check may be transmitted in a GET scheme or POST scheme. For example, the electronic device 101 may include any one of the ODSA operations shown in Table 2 above in a request message and transmit the request message to the profile information transfer server 520 according to the on-device service activation (ODSA) procedure set forth in the standard document TS. 43. For example, in operation 1702, the electronic device 101 may request an eligibility check by transmitting a request message, which includes "CheckEligibility" as operation information, to the profile information transfer server 520 (e.g., an entitlement server) according to the procedure set forth in the standard document TS. 43. According to various embodiments of the disclosure, the request message for the eligibility check may further include identification information (e.g., IMEI or UUID) or an authentication token of the electronic device 101.

According to various embodiments of the disclosure, the profile information transfer server 520 may transmit a profile query to the carrier management server 550 (e.g., BSS or OSS) in operation 1704. The profile query may include subscription identification information (e.g., "SubscriptionID"). The carrier management server 550 may transmit a profile answer to the profile information transfer server 520 in response to receiving the profile query in operation 1706. In operation 1708, the profile information transfer server 520 may transmit a response message (e.g., a "200 OK" message) for the eligibility check request to the electronic device 101 in response to the reception of the profile answer. For example, when the eligibility check of the electronic device 101 is normally complete, the response message may indicate that the status information about the electronic device 101 is displayed as "enabled".

According to various embodiments of the disclosure, if the eligibility check is complete, the electronic device 101 may request a subscription, an opening, or a subscription transfer by transmitting, to the profile information transfer server 520 (e.g., an entitlement server), a subscription-related operation request message including "ManageSubscription" in Table 2 above, as operation information according to the procedure set forth in the standard document TS. 43 in operation 1710. According to various embodiments of the disclosure, the subscription-related operation request message may further include identification information (e.g., IMEI or UUID) or an authentication token of the electronic device 101. According to various embodiments of the disclosure, the subscription-related operation request message may further include type information of Table 3 above as parameter information.

According to various embodiments of the disclosure, the profile information transfer server 520 may transmit a subscription query to the carrier management server 550 (e.g., BSS or OSS) in operation 1712. The subscription query may include subscription identification information (e.g., "SubscriptionID") or IMEI. In operation 1714, the carrier management server 550 may send a request for profile preparation to the profile providing server 530 to prepare for a profile corresponding to the subscription-related operation request from the electronic device 101, in response to reception of the subscription query. In operation 1716, the profile providing server 530 may prepare for a profile in response to the request. In operation 1718, the profile providing server 530 may transfer profile information to the carrier management server 550. For example, the profile information may include profile ready status-related information (e.g., profile download ready or profile download delayed).

According to various embodiments of the disclosure, in operation 1720, the carrier management server 550 may transmit, to the profile information transfer server 520, a subscription answer message in response to the transmission of the subscription query from the profile information transfer server 520. In operation 1722, the profile information transfer server 520 may transmit a response message (e.g., a "200 OK" message) to the subscription-related operation request to the electronic device 101 in response to the subscription answer message. According to various embodiments of the disclosure, operations 1718 and 1720 may be omitted, or operation 1722 may be performed regardless of operations 1718 and 1720. For example, in response to receiving the subscription-related operation request from the electronic device 101 in operation 1710, the profile information transfer server 520 may transmit a subscription query in operation 1712 and, before receiving a subscription answer message in operation 1720, transmit a response message (e.g., "200 OK" message) to the subscription-related operation request in operation 1722. According to various embodiments of the disclosure, the response message to the subscription-related operation request may further include the subscription result information ("SubscriptionResult") of Table 4 above, as parameter information.

According to various embodiments of the disclosure, when the profile download is ready in the profile providing server 530, the response message (e.g., "200 OK" message) to the subscription-related operation request may include the "DOWNLOAD PROFILE" as a parameter, as described above in connection with operation 1622 of FIG. 16. When the response message (e.g., "200 OK" message) to the subscription-related operation request includes the "DOWNLOAD PROFILE" as a parameter, information for accessing the profile providing server 530 may be further included. For example, the information for accessing the profile providing server 530 may include the address (or address information) of the profile providing server (e.g., the SM-DS+ 220) 530 or an activation code for identifying the address information. According to various embodiments of the disclosure, as described above in connection with operation 1624 of FIG. 16, the electronic device 101 may download the profile from the profile providing server 530 based on information for accessing the profile providing server 530 (e.g., the address (or address information) of the profile providing server (e.g., SM-DP+ 220 (530) or activation code for identifying the address information).

According to various embodiments of the disclosure, when the profile is not ready in the profile providing server 530, the response message (e.g., "200 OK" message) to the subscription-related operation request may include the "DELAYED DOWNLOAD" as a parameter. According to various embodiments of the disclosure, when the response message (e.g., "200 OK" message) to the subscription-related operation request includes the "DELAYED DOWNLOAD" as a parameter, it may identify the profile ready status from the profile providing server 530 periodically or at the request from the user as described above in connection with FIGS. 6, 7A, 7B, 8A, 8B, 9, 10, 11, 12A, 12B, 13, and 14.

For example, as shown in FIG. 17, when the information related to the web server 510 (e.g., the address information about the web server 510) is not provided from the communication carrier server 500 to the electronic device 101, the electronic device may fail to receive a callback message including the profile ready status from the communication carrier server. For example, as the electronic device does not receive the callback message from the communication carrier server, the electronic device may fail to identify whether the profile download preparation status is delayed.

According to various embodiments of the disclosure, as shown in FIG. 17, when the electronic device 101 transmits a subscription-related operation request to the communication carrier server 500 (e.g., the profile information transfer server 520), a response message to the request, transmitted from the communication carrier server 500 (e.g., the profile information transfer server 520), may include information (e.g., "DELAYED DOWNLOAD") indicating that the profile ready status is delayed and be transmitted, so that the electronic device 101 may identify the profile ready status, as shown in operation 1722.

According to various embodiments of the disclosure, if the electronic device 101 identifies the profile delayed status as profile download preparation is not complete, through the parameter included in the response message to the subscription-related operation request, the electronic device 101 may display the profile ready status on the screen as described above in connection with operation 908 of FIG. 9. For example, the electronic device 101 may display a message (e.g., "We're setting up your plan on the server. You'll get a notification when it's ready to add to your phone") indicating the profile delayed status on the screen through a pop-up window 1000 as described above in connection with FIG. 10. The pop-up window 1000 may include a confirm button 1001 (e.g., "OK"), and when the user selects the confirm button 1001, the notification screen 1100 may be displayed on the screen of the electronic device 101 as described above in connection with FIG. 11. For example, the notification screen 1100 may include a status check button 1101 (e.g., "Check status") capable of identifying the profile download status.

According to various embodiments of the disclosure, in operation 1724, the electronic device 101 may identify the profile download preparation status or identify the address information about the profile providing server 530 by transmitting a service-related data request message to the profile information transfer server 520. For example, according to the procedure set forth in the standard document TS. 43, the electronic device 101 may transmit a service-related data request message, including the "AcquireConfiguration" of Table 2 as operation information, to the profile information transfer server 520 (e.g., an entitlement server). According to various embodiments of the disclosure, the service-related data request message may further include identification information (e.g., IMEI or UUID) or an authentication token of the electronic device 101.

According to various embodiments of the disclosure, in operation 1726, the profile information transfer server 520 may transmit a subscription status query (e.g., "Subscription Status Query") message to the carrier management server 550. In operation 1728, the carrier management server 550 may transmit a response message (e.g., "Subscription Status Answer") to the subscription status query message to the profile information transfer server 520. In operation 1730, the profile information transfer server 520 may transmit a response message (e.g., a "200 OK" message) to the service-related data request to the electronic device 101 in response to reception of the subscription status response message. According to various embodiments of the disclosure, the electronic device 101 may identify the profile ready status with reference to a parameter included in the response message to the service-related data request. For example, when the parameter included in the response message indicates "ACTIVATING", it may be identified as a state in which the profile download is not ready or the profile download is ready but the profile may not be activated. According to various embodiments of the disclosure, when the response message of operation 1730 includes address information about the profile providing server 530, the electronic device 101 may access the profile providing server 530 using the address information about the profile providing server 530.

According to various embodiments of the disclosure, the above-described operations 1724, 1726, 1728, and 1730 may be omitted. For example, when the address information about the profile providing server 530 is identified by operation 1722, operations 1724, 1726, 1728, and 1730 may be omitted. As another example, when the electronic device 101 may not identify the address information about the profile providing server 530, it may be implemented to perform operation 1724 periodically or based on a set condition. For example, upon receiving a user input for identifying the profile download preparation status from the user, the electronic device 101 may be triggered by the user input and perform operation 1724. As another embodiment of the disclosure, after receiving the response message in operation 1722, the electronic device 101 may drive a timer and, if a time (e.g., 30 seconds) set as the timer is driven elapses, transmit a polling message. According to various embodiments of the disclosure, when the parameter included in the response message of operation 1730 indicates "ACTIVATING," it may be identified as a state in which profile download preparation is not complete or a state in which the profile has been downloaded but is not activated.

According to various embodiment of the disclosure s, if profile is ready in the profile providing server 530, the profile information transfer server 520 may identify the profile ready status in operation 1732. According to various embodiments of the disclosure, in operation 1734, the profile information transfer server 520 may transmit a push message to the electronic device 101 in response to identifying the profile ready status. For example, the profile information transfer server 520 may transfer the push message to the electronic device 101 through a web push server (not shown).

According to various embodiments of the disclosure, when the electronic device 101 fails to identify the address of the profile providing server 530, the electronic device 101 may transmit a service-related data request message to the profile information transfer server 520 in operation 1736. Operation 1736 may correspond to the profile download information request of operation 614 described above with reference to FIG. 6. For example, according to the procedure set forth in the standard document TS. 43, the electronic device 101 may transmit a service-related data request message, including the "AcquireConfiguration" of Table 2 as operation information, to the profile information transfer server 520 (e.g., an entitlement server). According to various embodiments of the disclosure, the service-related data request message may further include identification information (e.g., IMEI or UUID) or an authentication token of the electronic device 101.

According to various embodiments of the disclosure, in operation 1738, the profile information transfer server 520 may transmit a subscription status query (e.g., "Subscription Status Query") message to the carrier management server 550. In operation 1740, the carrier management server 550 may transmit a response message (e.g., "Subscription Status Answer") to the subscription status query message to the profile information transfer server 520. In operation 1742, the profile information transfer server 520 may transmit a response message (e.g., a "200 OK" message) to the service-related data request to the electronic device 101 in response to reception of the subscription status response message. For example, the response message of operation 1742 may correspond to the profile download information transfer of operation 616 described above with reference to FIG. 6.

According to various embodiments of the disclosure, the electronic device 101 may identify the profile ready status with reference to a parameter included in the response message to the service-related data request. For example, when the parameter included in the response message indicates "ACTIVATED", it may be identified that the profile is ready. According to various embodiments of the disclosure, the response message (e.g., a "200 OK" message) may further include information for accessing the profile providing server 530. For example, the information for accessing the profile providing server 530 may include the address (or address information) of the profile providing server (e.g., the SM-DS+ 220) 530 or an activation code for identifying the address information. According to various embodiments of the disclosure, the activation code may include any one of the activation codes set forth in the GSMA standard document TS. 43. For example, the activation code may include at least one of the address of the SM-DS+ 220 (530), an activation code token, or SMDPid. According to various embodiments of the disclosure, when the address information about the profile providing server 530 has already been identified before operation 1736, operations 1736, 1738, 1740, and 1742 may be omitted.

According to various embodiments of the disclosure, in operation 1744, the electronic device 101 may download the profile from the profile providing server 530 based on information for accessing the profile providing server 530 (e.g., the address (or address information) of the profile providing server (e.g., SM-DP+ 220 (530) or activation code for identifying the address information). In operation 1746, the electronic device 101 may install the profile in the eSIM 201 (e.g., eUICC) and activate the installed profile. Through profile activation, a subscription, an opening, or a subscription transfer procedures for using a communication service through profile download to the electronic device 101 may be complete. The electronic device 101 may use the mobile communication network after authentication with the mobile communication system using the profile installed in the eSIM 201.

According to any one of various embodiments of the disclosure, an electronic device may comprise at least one embedded universal integrated circuit card (eUICC) each storing at least one subscriber identification information; and at least one processor electrically connected with the eUICC. The at least one processor may be configured to control to transmit, to a first server, a first request message including information about an operation related to a subscription or an subscription transfer based on the eUICC and receive a first response message from the first server, in response to the transmission of the first request message. The first response message may include information indicating that a profile to be provided for the eUICC is not ready in response to the first request message.

According to various embodiments of the disclosure, the first response message may include information indicating that the profile is not ready, based on the first server not providing the electronic device with web server-related information for the subscription or the subscription transfer.

According to various embodiments of the disclosure, the at least one processor may be further configured to control to transmit, to the first server, a second request message including information related to a service status request, based on the first response message including the information indicating that the profile to be provided for the eUICC is not ready and receive a second response message from the first server, in response to the transmission of the second request message. The second response message may include address information corresponding to a second server providing the profile.

According to various embodiments of the disclosure, the at least one processor may be further configured to receive a request for identifying the profile, transmit, to a second server providing the profile, a third request message for identifying a download preparation status of the profile, in response to the reception of the request for identifying the profile, receive a third response message from the second server, in response to the transmission of the third request message, and control to request the second server to download the profile, based on the third response message including information indicating that the profile is ready.

According to various embodiments of the disclosure, the electronic device may further comprise a touchscreen. The at least one processor may be further configured to receive a request for identifying the profile through the touchscreen.

According to any one of various embodiments of the disclosure, an electronic device may comprise at least one embedded universal integrated circuit card (eUICC) each storing at least one subscriber identification information and at least one processor electrically connected with the eUICC. The at least one processor may be configured to receive a request for identifying a profile, based on that address information corresponding to a profile providing server providing the profile is not identified, obtains the address information corresponding to the profile providing server from a communication carrier server, transmit a message for identifying a status of preparation of the profile to the profile providing server, based on the address information corresponding to the profile providing server, and based on identifying that the profile is ready, controls to download the profile from the profile providing server and store the profile in the eUICC.

According to various embodiments of the disclosure, the electronic device may further comprise a touchscreen. The at least one processor may be further configured to receive a request for identifying the profile through the touchscreen.

According to various embodiments of the disclosure, the at least one processor may be further configured to receive a request for identifying the profile before receiving a message corresponding to profile ready.

According to various embodiments of the disclosure, the message corresponding to the profile ready may be received through a push message.

According to various embodiments of the disclosure, the at least one processor may be further configured to obtain the address information corresponding to the profile providing server from an entitlement server.

According to various embodiments of the disclosure, the at least one processor may be further configured to receive information regarding a profile ready status from the entitlement server in response to a request for at least one of a subscription, an opening, or a subscription transfer for a communication service and control to display a pop-up window indicating that generation of the profile is delayed based on identifying that the generation of the profile is delayed from the received information regarding the profile ready status.

According to various embodiments of the disclosure, the request for identifying the profile may be received through the pop-up window.

According to various embodiments of the disclosure, the at least one processor may be further configured to drive a first timer, identify whether the first timer expires based on receiving the request for identifying the profile through the pop-up window, and transmit a message for identifying the profile ready status based on identifying that the first timer expires.

According to various embodiments of the disclosure, the at least one processor may be further configured to drive a second timer and control to delete the pop-up window indicating that the generation of the profile is delayed based on identifying that the second timer expires.

According to various embodiments of the disclosure, the at least one processor may be further configured to receive a message indicating that the profile is ready from the profile providing server based on identifying that the profile is ready.

According to various embodiments of the disclosure, a method for installing a profile of an embedded SIM in an electronic device including at least one embedded universal integrated circuit card (eUICC) storing at least one subscriber identity information and at least one processor electrically connected with the eUICC may comprise receiving a request for identifying a profile, based on that address information corresponding to a profile providing server providing the profile is not identified, obtaining the address information corresponding to the profile providing server from a communication carrier server, transmitting a message for identifying a status of preparation of the profile to the profile providing server, based on the address information corresponding to the profile providing server, and based on identifying that the profile is ready, downloading the profile from the profile providing server and storing the profile in the eUICC.

According to various embodiments of the disclosure, the method may further comprise receiving the request for identifying the profile through a touchscreen.

According to various embodiments of the disclosure, the method may further comprise receiving the request for identifying the profile before receiving a message corresponding to profile ready.

According to various embodiments of the disclosure, the message corresponding to the profile ready may be received through a push message.

According to various embodiments of the disclosure, the method may further comprise obtaining the address information corresponding to the profile providing server from an entitlement server.

According to various embodiments of the disclosure, the method may further comprise receiving information regarding a profile ready status from the entitlement server in response to a request for at least one of a subscription, an opening, or a subscription transfer for a communication service; and displaying a pop-up window indicating that generation of the profile is delayed if it is identified that the generation of the profile is delayed from the received information regarding the profile ready status.

According to various embodiments of the disclosure, the request for identifying the profile may be received through the pop-up window.

According to various embodiments of the disclosure, the method may further comprise driving a first timer; identifying whether the first timer expires if receiving the request for identifying the profile through the pop-up window; and transmitting a message for identifying the profile ready status if the first timer expires.

According to various embodiments of the disclosure, the method may further comprise driving a second timer; and deleting the pop-up window indicating that the generation of the profile is delayed if the second timer expires.

According to various embodiments of the disclosure, the method may further comprise receiving a message indicating that the profile is ready from the profile providing server if the profile is ready.

The electronic device according to an embodiment of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to an embodiment of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
an embedded universal integrated circuit card (eUICC) storing at least one subscriber identification information;
at least one processor communicatively coupled to the eUICC;
memory storing computer-executable instructions that, when executed by the at least one processor individually or collectively, cause the electronic device to:
transmit, to a first server, a first request message for a subscription or a subscription transfer associated with the eUICC, and
receive, from the first server, a first response message as a response to the first request message,
wherein the first response message includes information indicating delayed download for a profile to be provided for the eUICC.

2. The electronic device of claim 1, wherein the first response message includes the information indicating delayed download for the profile, based on the first server not providing the electronic device with web server-related information for the subscription or the subscription transfer.

3. The electronic device of claim 1,
wherein the computer-executable instructions, when executed by the at least one processor individually or collectively, cause the electronic device to:
transmit, to the first server, a second request message for acquiring configuration, based on the first response message including the information indicating delayed download for the profile, and
receive, from the first server, a second response message as a response to the second request message, and
wherein the second response message includes address information corresponding to a second server providing the profile.

4. The electronic device of claim 1, wherein the computer-executable instructions, when executed by the at least one processor individually or collectively, cause the electronic device to:
receive a request for identifying the profile,
in response to reception of the request for identifying the profile, transmit, to a second server providing the profile, a third request message for identifying the download preparation status of the profile,
receive, from the second server, a third response message as a response to the third request message, and
request the second server to download the profile, based on the third response message including information indicating that the download preparation status of the profile is a profile ready status.

5. The electronic device of claim 4, further comprising:
a touchscreen,
wherein the computer-executable instructions, when executed by the at least one processor individually or collectively, cause the electronic device to:
receive the request for identifying the profile through the touchscreen.

6. An electronic device comprising:
an embedded universal integrated circuit card (eUICC) storing at least one subscriber identification information;
at least one processor communicatively coupled to the eUICC; and
memory storing computer-executable instructions that, when executed by the at least one processor individually or collectively, cause the electronic device to:
receive a request for identifying a profile,
based on address information corresponding to a profile providing server providing the profile not being identified, obtain the address information corresponding to the profile providing server from a communication carrier server,
based on the address information corresponding to the profile providing server, transmit a message for identifying a download preparation status of the profile to the profile providing server,
receive a profile check result from the profile providing server in response to the message, wherein the profile check result includes information indicating the download preparation status of the profile, and
based on identifying that the download preparation status of the profile is a profile ready status, download the profile from the profile providing server and store the profile in the eUICC.

7. The electronic device of claim 6, further comprising:
a touchscreen,
wherein the computer-executable instructions, when executed by the at least one processor individually or collectively, cause the electronic device to:
receive the request for identifying the profile through the touchscreen.

8. The electronic device of claim 6, wherein the computer-executable instructions, when executed by the at least one processor individually or collectively, cause the electronic device to:
receive the request for identifying the profile before receiving a message corresponding to the profile ready status.

9. The electronic device of claim 8, wherein the message corresponding to the profile ready status is received through a push message.

10. The electronic device of claim 6, wherein the computer-executable instructions, when executed by the at least one one processor individually or collectively, cause the electronic device to:
obtain the address information corresponding to the profile providing server from an entitlement server.

11. The electronic device of claim 10, wherein the computer-executable instructions, when executed by the at least one processor individually or collectively, cause the electronic device to:

receive information regarding a profile preparation status from the entitlement server in response to a request for at least one of a subscription, an opening, or a subscription transfer for a communication service, and based on identifying that generation of the profile is delayed from the received information regarding the profile preparation status, display a pop-up window indicating that generation of the profile is delayed.

12. The electronic device of claim 11, wherein the request for identifying the profile is received through the pop-up window.

13. The electronic device of claim 12, wherein the computer-executable instructions, when executed by the at least one processor individually or collectively, cause the electronic device to:

drive a first timer, based on receiving the request for identifying the profile through the pop-up window, identify whether the first timer expires, and based on identifying that the first timer expires, transmit the message for identifying the profile preparation status.

14. The electronic device of claim 11, wherein the computer-executable instructions, when executed by the at least one processor individually or collectively, cause the electronic device to:

drive a second timer, and based on identifying that the second timer expires, delete the pop-up window indicating that the generation of the profile is delayed.

15. The electronic device of claim 6, wherein the computer-executable instructions, when executed by the at least one processor individually or collectively, cause the electronic device to:

based on receiving a message indicating that the download preparation status of the profile is the profile ready status from the profile providing server, identify that the profile download preparation is ready.

16. A method for installing a profile of an embedded subscriber identity module (eSIM) in an electronic device including an embedded universal integrated circuit card (eUICC), the method comprising:

receiving a request for identifying a profile;

based on address information corresponding to a profile providing server providing the profile not being identified, obtaining the address information corresponding to the profile providing server from a communication carrier server;

based on the address information corresponding to the profile providing server, transmitting a message for identifying a download preparation status of the profile to the profile providing server;

receiving a profile check result from the profile providing server in response to the message, wherein the profile check result includes information indicating the download preparation status of the profile; and based on identifying that the download preparation status of the profile is a profile ready status, downloading the profile from the profile providing server and storing the profile in the eUICC.

17. The method of claim 16, wherein the request for identifying the profile through a touchscreen.

18. The method of claim 16, wherein the request for identifying the profile before receiving a message corresponding to the profile ready status.

19. The method of claim 18, wherein the message corresponding to the profile ready status is received through a push message.

20. The method of claim 16, wherein the address information corresponding to the profile providing server is obtained from an entitlement server.

21. An electronic device comprising:

an embedded universal integrated circuit card (eUICC) storing at least one subscriber identification information;

at least one processor communicatively coupled to the eUICC; and memory storing computer-executable instructions that, when executed by the at least one processor individually or collectively, cause the electronic device to:

transmit, to a first server, a first request message for a subscription or a subscription transfer associated with the eUICC, receive, from the first server, a first response message as a response to the first request message, in case that the first response message includes information indicating delayed download for a profile to be provided for the eUICC, provide a user interface (UI) for a profile check request, in response to receiving an user input through the UI, transmit a second request message for acquiring configuration to the first server, receive, from the first server, a second response message as a response to the second request message, and in case the second response message includes information regarding a profile activated status indicating that the profile is ready for download, download the profile from a second server and store the profile in the eUICC.

22. The electronic device of claim 21, wherein the computer-executable instructions, when executed by the at least one processor individually or collectively, cause the electronic device to:

in case that the second response message includes information indicating delayed download for the profile, repeatedly transmit the second request message until receiving the second response message including the information indicating that the profile is ready for download.

23. The electronic device of claim 21, wherein the second request message includes at least one of identification information of the eUICC, identification information of the electronic device, or an authentication token of the electronic device.

24. The electronic device of claim 21, wherein the second response message includes an activation code for identifying address information of the second server.

25. The electronic device of claim 21, wherein the computer-executable instructions, when executed by the at least one processor individually or collectively, cause the electronic device to:

in case the first response message includes information indicating that the profile is ready for download, download the profile from the second server and store the profile in the eUICC.

26. An electronic device comprising:

an embedded universal integrated circuit card (eUICC) storing at least one subscriber identification information;

at least one processor communicatively coupled to the eUICC; and memory storing computer-executable instructions that, when executed by the at least one processor individually or collectively, cause the electronic device to:
- transmit, to a first server, a first request message for a subscription or a subscription transfer associated with the eUICC,
- receive, from the first server, a first response message as a response to the first request message,
- in case that the first response message includes information indicating delayed download for a profile to be provided for the eUICC, transmit, to the first server, a second request message for acquiring configuration,
- receive, from the first server, a second response message as a response to the second request message, and
- in case the second response message includes information regarding a profile activated status indicating that the profile is ready for download, download the profile from a second server and store the profile in the eUICC.

27. The electronic device of claim 26, wherein the computer-executable instructions, when executed by the at least one processor individually or collectively, cause the electronic device to:
- in case that the second response message includes information indicating delayed download for the profile, repeatedly transmit the second request message until receiving the second response message including the information indicating that the profile is ready for download.

28. The electronic device of claim 26, wherein the computer-executable instructions, when executed by the at least one processor individually or collectively, cause the electronic device to:
- in case the first response message includes information indicating that the profile is ready for download, download the profile from the second server and store the profile in the eUICC.

29. The electronic device of claim 26, wherein the computer-executable instructions, when executed by the at least one processor individually or collectively, cause the electronic device to:
- in case the second response message includes information regarding a profile activating status indicating that the profile may not be activated, receive, from the first server, a profile ready status message when the profile is ready, and
- transmit, to the first server, a third request message for acquiring configuration as a response to the profile ready status message.

30. The electronic device of claim 26, wherein the computer-executable instructions, when executed by the at least one processor individually or collectively, cause the electronic device to:
- in case the second response message includes information regarding a profile activating status indicating that the profile is not ready or the profile is ready but the profile may not be activated, transmit, to the first server, the second request message for acquiring configuration based on a user input.

31. The electronic device of claim 26, wherein the computer-executable instructions, when executed by the at least one processor individually or collectively, cause the electronic device to:
- in case the second response message includes information regarding a profile activating status indicating that the profile is not ready or the profile is ready but the profile may not be activated, transmit, to the first server, the second request message for acquiring configuration based on a time interval.

32. The electronic device of claim 26, wherein the computer-executable instructions, when executed by the at least one processor individually or collectively, cause the electronic device to:
- in case the second response message includes information regarding a profile activating status indicating that the profile is not ready or the profile is ready but the profile may not be activated, download the profile from the profile providing server corresponding to address information, based on the address information being identified.

33. A method for installing a profile of an embedded subscriber identity module (eSIM) in an electronic device including an embedded universal integrated circuit card (eUICC), the method comprising:
- transmitting, to a first server, a first request message for a subscription or a subscription transfer associated with the eUICC;
- receiving, from the first server, a first response message as a response to the first request message;
- in case that the first response message includes information indicating delayed download for a profile to be provided for the eUICC, transmitting, to the first server, a second request message for acquiring configuration;
- receiving, from the first server, a second response message as a response to the second request message; and
- in case the second response message includes information regarding a profile activated status indicating that the profile is ready for download, downloading the profile from a second server and storing the profile in the eUICC.

34. A method for installing a profile of an embedded subscriber identity module (eSIM) in an electronic device including an embedded universal integrated circuit card (eUICC), the method comprising:
- transmitting, to a first server, a first response message for a subscription or a subscription transfer associated with the eUICC;
- receiving, from the first server, a first response message as a response to the first request message;
- in case that the first response message includes information indicating delayed download for a profile to be provided for the eUICC, providing a user interface (UI) for a profile check request;
- in response to receiving an user input through the UI, transmitting a second request message for acquiring configuration to the first server;
- receiving, from the first server, a second response message as a response to the second request message; and
- in case the second response message includes information regarding a profile activated status indicating that the profile is ready for download, downloading the profile from a second server and store the profile in the eUICC.

* * * * *